US012768818B2

(12) United States Patent
Zhao et al.

(10) Patent No.: US 12,768,818 B2
(45) Date of Patent: Oct. 20, 2026

(54) HIGH-PRECISION ULTRASONIC IMAGING METHOD FOR INTERNAL DEFECT OF COMPLEX-SHAPED COMPONENT BASED ON SEARCH-VECTOR IMAGING CONDITION

(71) Applicant: Zhejiang University, Hangzhou City (CN)

(72) Inventors: Peng Zhao, Hangzhou City (CN); Kaipeng Ji, Hangzhou City (CN); Hao Chen, Hangzhou City (CN); Chaojie Zhuo, Hangzhou City (CN); Jianzhong Fu, Hangzhou City (CN)

(73) Assignee: Zhejiang University, Hangzhou City (CN)

( * ) Notice: Subject to any disclaimer, the term of this patent is extended or adjusted under 35 U.S.C. 154(b) by 295 days.

(21) Appl. No.: 18/586,040

(22) Filed: Feb. 23, 2024

(65) Prior Publication Data

US 2024/0288403 A1 Aug. 29, 2024

(30) Foreign Application Priority Data

Feb. 23, 2023 (CN) ......................... 202310154075.4

(51) Int. Cl.
*G01N 29/06* (2006.01)
*G01N 29/44* (2006.01)
*G01N 29/46* (2006.01)
*G01N 29/52* (2006.01)

(52) U.S. Cl.
CPC ....... *G01N 29/069* (2013.01); *G01N 29/4472* (2013.01); *G01N 29/46* (2013.01); *G01N 29/52* (2013.01)

(58) Field of Classification Search
CPC .. G01N 29/069; G01N 29/4472; G01N 29/46; G01N 29/52; G01N 29/0654; G01N 29/44; G01N 29/50
See application file for complete search history.

(56) References Cited

U.S. PATENT DOCUMENTS

2024/0068993 A1 * 2/2024 Matheson ............ G01N 29/069

OTHER PUBLICATIONS

Laroche et al, "An inverse approach for ultrasonic imaging from full matrix capture data. Application to resolution enhancement in NDT", IEEE Transactions on Ultrasonics, Ferroelectrics and Frequency Control, 2020, 67 (9), pp. 1877-1887 (Year: 2020).*

* cited by examiner

*Primary Examiner* — David Z Huang
(74) *Attorney, Agent, or Firm* — Suiter Swantz IP

(57) ABSTRACT

The present disclosure provides a high-precision ultrasonic imaging method for an internal defect of a complex-shaped component based on a search-vector imaging condition. Based on full waveform inversion, the search-vector imaging condition is constructed, and a first-order derivative vector is combined with an approximate Hessian matrix for correction so that a high-quality image of a defect in a complex sound velocity model can be obtained. The high-precision ultrasonic imaging method is suitable for defect testing on complex surface components. The imaging condition used for the imaging method of the present disclosure does not involve an assumption on a wave field and is stricter than a traditional imaging condition theory, thereby ensuring high precision of the inventive method. Moreover, the imaging method of the present disclosure can highlight a defect in an entire measurement area, which is very convenient for locating a defect in a large-size measurement structure.

3 Claims, 13 Drawing Sheets

HIGH-PRECISION ULTRASONIC IMAGING METHOD FOR INTERNAL DEFECT OF COMPLEX-SHAPED COMPONENT BASED ON SEARCH-VECTOR IMAGING CONDITION

CROSS REFERENCE TO RELATED APPLICATION

This patent application claims the benefit and priority of Chinese Patent Application No. 202310154075.4, filed with the China National Intellectual Property Administration on Feb. 23, 2023, the disclosure of which is incorporated by reference herein in its entirety as part of the present application.

TECHNICAL FIELD

The present disclosure belongs to the technical field of ultrasonic imaging, and in particular, to a high-precision ultrasonic imaging method for an internal defect of a complex-shaped component based on a search-vector imaging condition.

BACKGROUND

With the continuous improvement of the manufacturing technology, there are increasingly fewer constraints for component shapes. Therefore, components having complex shapes are manufactured in quantity to meet the requirements under various working conditions. Among these components, a shaft and a cam shaft are common transmission components having curved surfaces. Meanwhile, more complicated surface components have emerged in the fields of automobiles, energy sources, and aerospace. However, these components are prone to formation of pore and crack defects in a complex manufacturing process and a severe service course, and the pore and crack defects greatly impair the mechanical properties of the components and result in a premature failure of them and even serious accidents. Therefore, high-quality testing on an internal defect of a complex-shaped component has become a research hotspot. However, a large testing area and a complex surface shape pose a huge challenge for testing.

Three typical nondestructive testing (NDT) techniques, i.e., infrared (IR) thermal imaging, X-ray tomography, and ultrasonic scanning, have been extensively applied to internal defect imaging. For the IR thermal imaging, a heating assembly is utilized to accumulate heat at a defect and cause local temperature rise which may be captured by an infrared camera and used to determine the position of the defect. However, the IR thermal imaging can only be utilized to test an internal defect close to a surface and cannot determine a depth of the defect. By the X-ray tomography, ray images at different angles are captured to reconstruct an internal defect of a component with high precision. However, complex calculation is required for the reconstruction process. Therefore, the X-ray tomography is not suitable for inspecting large components. Due to good penetrability of ultrasonic waves and low requirements on the working environment, the ultrasonic scanning has few restrictions on an inspection assembly. Moreover, ultrasonic phased array imaging has attained a prominent position in NDT due to the portability, reliability, and relatively high precision thereof, and can effectively detect a defect located within a component. By full matrix capture (FMC), a complete time-domain signal between each pair of transmitting and receiving array elements is collected, and the imaging resolution can be improved and the distortion of an imaging object can be reduced.

Since the surface of the ultrasonic phased array is usually flat, a probe and a complex-shaped component can be coupled by means of water or a particular wedge block. Under such a measurement condition, a sound velocity within a measurement area may have changes in both of horizontal and vertical directions. To this end, there are three imaging methods: an imaging method based on total focusing method (TFM), an imaging method based on phase shift migration (PSM), and an imaging method based on reverse time migration (RTM). In these methods, a defect image is generated under an excitation-time imaging condition. An ultrasonic wave field is regarded as a combination of an incident wave field and a reflected wave field, where the reflected wave field is actively emitted from a reflection point at a certain time, and an excitation time is determined by the incident wave field.

The method based on TFM uses rays to approximate wave field propagation, reconstructs a wave field by time delaying, and introduces a ray tracing method to calculate a ray path. However, the imaging precision of the method based on TFM depends on path search precision which is most applicable for a two-layer model and is prone to failure when a sound velocity model is complex. The method based on PSM is to reconstruct incident and reflected wave fields by phase extrapolation in a frequency-wavenumber domain, and is readily adaptable to the change of a sound velocity in the vertical direction. Researchers introduced phase shift plus interpolation (PSPI) and non-stationary phase-shift (NSPS) methods to compensate for the change of the sound velocity in the horizontal direction. However, a phase shift is first-order approximation of a wave equation, and the PSPI or NSPS involves an assumption that the change of the sound velocity in the horizontal direction is tiny relative to an average sound velocity. Therefore, when the sound velocity changes dramatically in the horizontal direction, the imaging precision of the method based on PSM will decline greatly. The method based on RTM is to reconstruct incident and reflected wave fields by a finite difference solution of a wave equation. Compared with the first two methods, the method based on RTM has greatly reduced assumption on wave field propagation. Therefore, the method based on RTM is applicable to any complex shape with improved imaging precision. However, the method based on RTM still has the shortcoming of insufficient illumination at a deep position due to sound scattering and thus usually fails to highlight a defect image in an entire measurement area, and the defect image needs to be obtained by manual search in a local area.

SUMMARY

To solve the problems in the prior art, the present disclosure provides a high-precision ultrasonic imaging method for an internal defect of a complex-shaped component based on a search-vector imaging condition, where under the search-vector (vector) imaging condition, a first-order derivative vector of full waveform inversion and an approximate Hessian matrix are utilized to obtain a high-precision defect image, and high-precision testing of the internal defect of the complex-shaped component can be realized. The imaging method can highlight a defect image within an entire measurement area and can locate a defect in a large-size measurement structure very conveniently. All pores and cracks in the entire resulting image can be highlighted clearly. High imaging resolution and a high signal to noise ratio (SNR) can be achieved.

A high-precision ultrasonic imaging method for an internal defect of a complex-shaped component based on a search-vector imaging condition includes the following steps:

(1) inputting an excitation signal, a sound velocity model, and full matrix capture (FMC) data measured;

(2) preprocessing the excitation signal and the FMC data to obtain a sound source matrix and a residual matrix within a frequency domain, respectively; discretizing the sound velocity model to obtain a sound velocity vector, and obtaining an impedance matrix by calculation;

(3) for any frequency not traversed, solving the sound source matrix and the residual matrix by LU decomposition of the impedance matrix to obtain a forward wave field and a residual wave field of the frequency, respectively;

(4) multiplying the impedance matrix by the forward wave field after obtaining a partial derivative of the sound velocity vector to obtain a total virtual source matrix, and meanwhile, normalizing the forward wave field by an amplitude of an excitation value of the excitation signal to obtain a unit forward wave field;

(5) multiplying the total virtual source matrix by the unit forward wave field and the residual wave field to obtain a partial derivative matrix and a gradient matrix corresponding to the frequency, respectively; and (6) repeating steps (3) to (5) until all frequencies are traversed completely to obtain partial derivative matrices and gradient matrices of all the frequencies, and obtaining an imaging result of an internal defect of a complex-shaped component by using a search-vector imaging condition.

In step (1), the excitation signal is represented by $S(x_r, x_s, t)$; the sound velocity model is represented by $c(x,z)$; and the FMC data is represented by $D(x_r, x_s, t)$, where $x_r$ represents the rth receiving array element; $x_s$ represents the sth transmitting array element; r and s are each independently taken from [1,M]; M represents a number of array elements; and t represents a time.

Preferably, in step (2), the excitation signal and the FMC data are preprocessed separately. That is, temporal one-dimensional Fourier transformation is performed on the excitation signal and the FMC data separately.

Preferably, in step (2), a calculation formula for the residual matrix $\delta D(c)$ is as follows:

$$\delta D(c) = D - \hat{D}(c)$$

where D represents a measured value of the FMC data; and $\hat{D}(c)$ represents an estimated value of the FMC data.

Assuming that the sound velocity model is smooth without reflection, the estimated value of the FMC data is 0, and the residual matrix is $\delta D(c)=D$.

Temporal one-dimensional Fourier transformation is performed on the measured FMC data within a time domain to obtain FMC data within a frequency domain, namely the residual matrix within the frequency domain. That is, $\delta D(c, \omega)=D(x_r, x_s, \omega)$, where ω represents the frequency.

Preferably, in step (2), the sound velocity model is discretized by using a finite difference method to obtain the sound velocity vector, and the impedance matrix is obtained through calculation by the following formula:

$$A(\omega) = \left[\nabla^2 + \omega^2/c^2\right]$$

where $A(\omega)$ represents an N×N impedance matrix; $\nabla^2$ represents a laplace operator obtained after the discretization; and c represents an N×1 sound velocity vector.

Preferably, in step (3), a solving formula for the forward wave field is as follows:

$$P(\omega) = [p_1(\omega), p_2(\omega), \ldots , p_M(\omega)] = A(\omega)^{-1} S(\omega)$$

where $S(\omega)$ represents the sound source matrix; $P(\omega)$ represents the forward wave field; and $A(\omega)^{-1}$ represents inverting $A(\omega)$.

A solving formula for the residual wave field is as follows:

$$V(\omega_j) = A(\omega_j)^{-1} W^T \delta D(c, \omega_j)$$

where $V(\omega_j)$ represents the residual wave field corresponding to frequency $\omega_j$; $\delta D(c,\omega_j)$ represents the residual matrix corresponding to the frequency $\omega_1$, $j \in [1, N_\omega]$; $N_\omega$ represents a number of discrete frequencies; W represents an M×N matrix, which extracts a sound field value at a node corresponding to a receiving array element in the entire wave field; an element at a node corresponding to the kth receiving array element in the kth row is 1, and other elements are all 0, where $k \in [1,M]$, and $M<N$; and the superscript T represents transposition.

Preferably, in step (4), the total virtual source matrix is defined as:

$$F(\omega) = \left[F^{(1)}(\omega), \ldots , F^{(N)}(\omega)\right]$$

where $$F^{(n)}(\omega) = -\frac{\partial A(\omega)}{\partial c_n} P(\omega)$$

where $F^{(n)}(\omega)$ is regarded as the nth virtual source, which is an N×M matrix; $c_n$ represents the nth sound velocity parameter (element) in the sound velocity vector; and $n \in [1,N]$.

The forward wave field is normalized by using the following formula:

$$\tilde{P}(\omega_j) = P(\omega_j)/a(\omega_j)$$

where $\tilde{P}(\omega_j)$ represents the unit forward wave field; $a(\omega_j)=S(x_s, x_s, \omega_j)$, for $S(x_r, x_s, \omega_j)$, there is an excitation value $a(\omega_j)$ only at $x_r=x_s$; and when $x_r \neq x_s$, $S(x_r, x_s, \omega_j)=0$.

Preferably, in step (5), a calculation formula for multiplying the total virtual source matrix by the unit forward wave field to obtain the partial derivative matrix is as follows:

$$J_l = \frac{\partial \hat{D}_i}{\partial c} = [f_{(l,1)}, f_{(l,2)}, \ldots , f_{(l,N)}]^T \tilde{p}_{(\omega j, x_r)},$$

where $J_l$ represents the N×1 partial derivative matrix of the lth data, where l=[1, . . . , L], $L=N_\omega \times M \times M$, representing a number of data points; and $l=(j-1)M^2+(s-1)M+r$.

$f_{(l,n)}$ represents a virtual source vector corresponding to the lth data and the nth parameter and is obtained by the total virtual source matrix, where the total virtual source matrix is expressed as: $F(\omega)=[F^{(1)}(\omega), \ldots, F^{(N)}(\omega)]$.

For frequency $\omega_j$, the following can be derived:

$$\left[f_{(l,n)}, f_{(l+1,n)}, \ldots, f_{(1+M^2-1,n)}\right] = \left[F^{(n)}(\omega_j), F^{(n)}(\omega_j), \ldots, F^{(n)}(\omega_j)\right]$$

In the above equation, the virtual source matrix is repeated for 64 times in a row direction on the right of the equation.

$\tilde{p}_{(\omega_j,x_r)}$ is derived from the unit forward wave field $\tilde{P}(\omega_j)$:

$$\tilde{P}(\omega_j) = \left[\tilde{p}_{(\omega j,x_1)}, \ldots, \tilde{p}_{(\omega j,x_M)}\right]$$

A calculation formula for multiplying the total virtual source matrix by the residual wave field to obtain the gradient matrix is as follows:

$$\nabla_c E(c, \omega_j) = F(\omega_j)^T \left[A(\omega_j)^{-1} W^T \delta D(c, \omega_j)\right] = F(\omega_j)^T V(\omega_j)$$

where $F(\omega_j)$ represents the total virtual source matrix corresponding to the frequency $\omega_j$.

Preferably, the search-vector imaging condition in step (6) is as follows:

$$\mathrm{Im} = -[\mathrm{diag}(H_a) + \gamma I]^{-1} \nabla_c E(c)$$

where Im represents the imaging result; I represents an N-dimension unit matrix; $\nabla_c E(c)$ represents an N×1 gradient matrix; and $\gamma$ represents a damping coefficient for stable inversion.

$H_a=J^T J^*$, where J represents the partial derivative matrix; and superscripts T and * represent transposition and complex conjugation, respectively.

The nth element in $\nabla_c E(c)$ is obtained by the following formula:

$$\nabla_c E(c)_n = \sum_{j=1}^{N_\omega} \sum_{s=1}^{M} \sum_{r=1}^{M} \nabla_c E(c, \omega_j)_{(s-1)N+n,r}$$

where the subscript of $\nabla_c E(c,\Omega_j)_{(s-1)N+n,r}$ represents an element in row (s−1)N+n and column r; and n∈[1,N].

N diagonal elements of $H_a$ are obtained through calculation by the following formula according to all the partial derivative matrices:

$$\mathrm{diag}(H_a) = \sum_{j=1}^{N_\omega} \sum_{s=1}^{M} \sum_{r=1}^{M} J_l \circ J_l$$

where $\mathrm{diag}(H_a)$ represents an approximate Hessian matrix; and ∘ represents Hadamard multiplication, $$l = (j-1)M^2 + (s-1)M + r.$$

The theoretical derivation process of the imaging method of the present disclosure is as follows.

1.1 Frequency Wave Field

A frequency-domain wave field in an inhomogeneous medium meets the following formula:

$$\left[\nabla^2 + \frac{\omega^2}{(x, z)^2}\right] p(x, z, \omega) = s(x, z, \omega) \tag{1}$$

where x and z represent two spatial coordinates of a two-dimensional space, respectively; ω represents a frequency; z represents a depth; p(x,z,ω) represents a sound field (wave field); s(x,z,ω) represents a sound source field; and c(x,z) represents a sound velocity model.

In engineering practice, the formula (1) is usually solved by the finite difference method, where the wave field and the sound velocity model are discretized into $N=N_x \times N_z$ points, as shown in FIGS. 2A-B.

A discretized wave equation is as follows:

$$\left[\nabla^2 + \frac{\omega^2}{c^2}\right] p(\omega) = A(\omega) p(\omega) = s(\omega) \tag{2}$$

where c represents a sound velocity vector; p(ω) represents a wave field vector; s(ω) represents a sound source vector, and the three vectors are all N×1 vectors.

$A(\omega)=[\nabla^2+\omega^2/c^2]$ is an N×N impedance matrix, where $\nabla^2$ represents a laplace operator obtained after the discretization.

Therefore, the wave field p(ω) may be obtained by the following formula:

$$p(\omega) = A(\omega)^{-1} s(\omega) \tag{3}$$

where $A(\omega)^{-1}$ represents inverting A(ω); and LU decomposition of the impedance matrix may be introduced into the calculation of the wave field to improve the calculation efficiency.

The schematic diagram of phased array testing of a defect is as shown in FIG. 3. Array elements are excited orderly, and meanwhile, all the array elements receive signals. Therefore, FMC data (full matrix capture data) contains a time-domain signal of each transmitting-receiving pair, which is represented by $D(x_r,x_s,t)$ here, where $x_r$ and $x_s$ correspond to the rth receiving array element and the sth transmitting array element, respectively; s∈[1,M], r∈[1,M], and M represents a number of array elements. As shown in FIGS. 2A-B, an ultrasonic signal is emitted from array element $(x_s,0)$ and is received by an array element at position $(x_r,0)$ after being reflected by an interface and a defect. Each array element in a phased array can be represented by a node corresponding to the position of a center point in a discrete model, and wave fields at these nodes can be known from an FMC dataset.

The sound source matrix $S(\omega)=[s_1(\omega), s_2(\omega), \ldots, s_M(W)]$ is used to represent a sound source of the phased array having M array elements, and corresponding wave fields excited for the M array elements may be solved through one step by the following formula:

$$P(\omega)=[p_1(\omega),\,p_2(\omega),\,\ldots\,,\,p_M(\omega)]=A(\omega)^{-1}S(\omega) \tag{4}$$

where P(ω) represents a wave field matrix of the FMC data.

1.2 Full Waveform Inversion and Gradient Vector

Given the sound source matrix and the sound velocity model, the wave field matrix of the FMC data is calculated according to the formula (4); and frequency-domain FMC data is obtained by a wave field value at a corresponding node of a received, which is written as:

$$\hat{D}(c,\,\omega)=WP(\omega) \tag{5}$$

where $\hat{D}$(c,ω) represents an estimated value of the FMC data; W represents an M×N matrix, which extracts a sound field value at a node corresponding to a receiving array element in the entire wave field; an element at a node corresponding to the kth receiving array element in the kth row is 1, and other elements are all 0, where k∈[1,M], and M<N; and $\hat{D}$(c,ω) is an M×M matrix, and its element at position (r, s) corresponds to a signal received by the rth array element when the sth array element is excited. The entire FMC data $\hat{D}$(c) obtained through the calculation may be obtained by combining $\hat{D}$(c,ω) of each frequency.

A difference between the calculated FMC data $\hat{D}$(c) and the measured FMC data D is defined as a residual matrix, written as:

$$\delta D(c)=D-\hat{D}(c) \tag{6}$$

where δD(c) and $\hat{D}$(c) are both functions of the sound velocity vector c. The sound velocity vector c that minimizes the modulus of the residual matrix δD(c) is closest to the real sound velocity, which is the base of the full waveform inversion.

Here, an objective function is defined by using the $l_2$ norm of residual data δD(c):

$$E(c)=\frac{1}{2}\delta D(c)^T\delta D(c)^*=\frac{1}{2}\sum_{j=1}^{N_\omega}\sum_{s=1}^{M}\sum_{r=1}^{M}\left[D(x_r,\,x_s,\,\omega_j)-\hat{D}(x_r,\,x_s,\,\omega_j)\right]^2 \tag{7}$$

where the superscripts T and * represent transposition and complex conjugation, respectively; $N_\omega$ represents a number of discrete frequencies; M represents the number of array elements; and D($x_r$,$x_s$,ω) is obtained by performing Fourier transformation on D($x_r$,$x_s$,t) in time dimension.

A negative gradient direction may be used to update the sound velocity vector, written as:

$$\nabla_c E(c)=J^T\delta D(c) \tag{8}$$

where $\nabla_c$E(c) represents a gradient matrix; J is an L×N Frechet partial derivative matrix, and an element thereof is expressed as:

$$J_{l,n}=\frac{\partial\hat{D}_l}{\partial c_n}=\frac{\partial\hat{D}(x_r,\,x_s,\,\omega_j)}{\partial c_n},\ l=[1,\,\ldots\,,\,L];\ n=[1,\,\ldots\,,\,N] \tag{9}$$

where L=$N_\omega$×M×M represents a number of data points; l=(j−1)$M^2$+(s−1)M+r; and j∈[1,$N_\omega$].

Formula (10) may be derived by obtaining a partial derivative of the nth sound velocity parameter $c_n$ on both sides of the formula (4):

$$\frac{\partial P(\omega)}{\partial c_n}=A(\omega)^{-1}\left[-\frac{\partial A(\omega)}{\partial c_n}P(\omega)\right]=A(\omega)^{-1}F^{(n)}(\omega) \tag{10}$$

where $\frac{\partial A(\omega)}{\partial c_n}$ where ∂A(ω)/∂$c_n$ represents an N×N partial derivative impedance matrix, which is a result of obtaining the partial derivative of the nth sound velocity parameter $c_n$ by the impedance matrix.

The form of the formula (10) is similar to that of the formula (4). $F^{(n)}$(ω) may be regarded as the nth virtual source, which is an N×M matrix, written as:

$$F^{(n)}(\omega)=-\frac{\partial A(\omega)}{\partial c_n}P(\omega) \tag{11}$$

Therefore, $\frac{\partial P(\omega)}{\partial c_n}$ is an N×M matrix, which is a solution of a forward problem.

Then, the Frechet partial derivative matrix at frequency $\omega_j$ may be written as:

$$J(\omega_j)=W\left[\frac{\partial P(\omega_j)}{\partial c_1},\,\ldots\,,\,\frac{\partial P(\omega_j)}{\partial c_N}\right]=WA(\omega_j)^{-1}\left[F^{(1)}(\omega_j),\,\ldots\,,\,F^{(N)}(\omega_j)\right] \tag{12}$$

where J($\Omega_j$) represents an M×MN matrix, and the whole Frechet partial derivative matrix J may be obtained by combining the J($\omega_j$) corresponding to all the discrete frequencies $\omega_j$.

A total virtual source matrix may be defined as F(ω)=[$F^{(1)}$(ω), . . . , $F^{(N)}$(ω)], which is an N×MN matrix.

Explicitly calculating the partial derivative matrix J is highly time-consuming, and the gradient matrix may be directly calculated by substituting the formula (12) into the formula (8):

$$\nabla_c E(c,\,\omega_j)=F(\omega_j)^T\left[A(\omega_j)^{-1}W^T\delta D(c,\,\omega_j)\right]=F(\omega_j)^TV(\omega_j) \tag{13}$$

where δD(c,$\omega_j$) represents an M×M residual data matrix at frequency $\omega_j$; and $\nabla_c$E(c,ω) represents an MN×M gradient matrix at frequency $\omega_j$.

Residual wave field V($\omega_j$) is an N×M matrix, which is calculated by the following formula:

$$V(\omega_j)=A(\omega_j)^{-1}W^T\delta D(c,\,\omega_j) \tag{14}$$

The nth element of the gradient matrix $\nabla_c E(c)$ is calculated by the following formula:

$$\nabla_c E(c)_n = \sum_{j=1}^{N_\omega} \sum_{s=1}^{M} \sum_{r=1}^{M} \nabla_c E(c, \omega_j)_{(s-1)N+n,r} \tag{15}$$

where the subscript of $\nabla_c E(c,\omega_j)_{(s-1)N+n,r}$ represents an element in row (s−1)N+n and column r.

In conclusion, to calculate a gradient component of each frequency $\omega_j$, forward modeling may be performed for 2 M times, where the forward modeling is performed for M times to obtain a forward wave field P(ω) according to the formula (4), and performed for another M times to obtain the residual wave field V(ω), as shown in formula (14). Therefore, the calculation quantity required by the gradient matrix $\nabla_c E(c)$ is acceptable, and the efficiency can be further improved by a parallel calculation method.

Most importantly, the wave fields generated by all the nodes as single scattering points are collected by the Frechet partial derivative matrix J at a receiving node, and the residual matrix δD(c) is real data received by a sensor from an unknown scattering point. Therefore, as shown in the formula (8), the gradient matrix is actually a result of zero-lag correlation between a corresponding scattering signal at each node and a real scattering signal. Naturally, a correlation value is large on real scattering point, but small on non-scattering points, and the non-scattering points occupy most of the measurement area. Therefore, the gradient matrix may be used as an image of a reflection point, and the formula (8) may be used as an imaging condition.

1.3 Search-Vector Imaging Condition

The negative gradient direction may be directly used to minimize the objective function (7). However, to increase a search speed, Newton method is usually used to correct a gradient in the full waveform inversion, denoted as:

$$dc = -H^{-1}\nabla_c E(c) \tag{16}$$

where dc represents the search vector; H represents an N×N Hessian matrix; and an element of H is obtained b formula (17):

$$H_{pq} = \frac{\partial^2 E(c)}{\partial c_p \partial c_q},\ p = (1, 2, \ldots, N);\ q = (1, 2, \ldots, N) \tag{17}$$

Since only the defect position is unknown for ultrasonic imaging, the input sound velocity model is approximate to actual sound velocity distribution, and the Hessian matrix may be approximated as:

$$H \approx H_a = J^T J^* \tag{18}$$

As can be seen from the formulas (9) and (18), a main diagonal element of $H_a$ is an auto-correlative zero-lag value of a partial derivative wave field on the receiving node, and non-diagonal elements are correlated zero-lag values of two partial derivative wave fields on the receiving node. In a high-frequency limit, $H_a$ is diagonally dominant.

Therefore, the diagonal elements of $H_a$ are used to approximate the Hessian matrix to avoid inverse operation of an unrealistic huge N-dimension matrix, and the search-vector imaging condition is written as:

$$Im = -[\mathrm{diag}(H_a) + \gamma I]^{-1}\nabla_c E(c) = -[\mathrm{diag}(H_a) + \gamma I]^{-1} J^T \delta D(c)] \tag{19}$$

where Im represents an imaging result; $\mathrm{diag}(H_a)$ represents diagonalizing $H_a$; I represents an N-dimension unit matrix; and γ represents a damping coefficient for stable inversion.

As described in section 1.2, the gradient matrix may be directly used as the image of the defect.

According to the formula (8), the gradient matrix depends on the Frechet partial derivative matrix J. The partial derivative matrix is composed of all partial derivative wave fields at the receiving node. Therefore, the characteristics of the partial derivative matrix J itself may affect the imaging result. On the one hand, the energy of the partial derivative wave field corresponding to a node at a deep position is always smaller than that at a shallow position, and therefore, the partial derivative matrix J may lead to insufficient illumination at a lower portion of an imageable area. On the other hand, different relative positions of a node to a sound source node and the receiving node may lead to different energy of the partial derivative wave fields, and therefore, the partial derivative matrix J may also lead to nonuniform illumination of the imageable area in the horizontal direction. The introduction of the Hessian matrix may eliminate the insufficient and nonuniform illumination caused by the Frechet partial derivative matrix J at gradients, enable a clearer and more concentrated imaging result, and balance imaging amplitudes at various positions.

According to the formula (18), the partial derivative matrix J needs to be solved to calculate $H_a$. However, it is unrealistic to directly calculate the partial derivative matrix J by the formula (12) because too much forward calculation is required.

Based on the definition of the partial derivative matrix J, the formula (9) may be further written as:

$$J_{l,n} = \frac{\partial \hat{D}_l}{\partial c_n} = O_{(x_r)}^T A(\omega_j)^{-1} f_{(l,n)} \tag{20}$$

where $f_{(l,n)}$ represents a virtual source vector corresponding to the lth data and the nth parameter; and.

$O_{(x_r)}$ is an N×1 vector, which is 1 only at node $(x_r,0)$ and 0 at other nodes. Therefore, the physical significance of $J_{l,n}$ is a received signal at node $f_{(l,n)}$ corresponding to the sound field excited by the virtual source vector $(x_r,0)$. In effect, $f_{(l,n)}$ represents the corresponding sound source at node n.

According to the reciprocal theorem, the wave field signal emitted by the nth node and received by node $(x_r,0)$ is equal to the wave field signal emitted by node $(x_r,0)$ and received by the nth node.

Therefore, $J_{l,n}$ may be obtained by the following formula:

$$J_{l,n} = f_{(l,n)}^T A(\omega_j)^{-1} O_{(x_r)} = f_{(l,n)}^T \tilde{p}_{(\omega_j,x_r)} \tag{21}$$

where $\tilde{p}_{(\omega_j,x_r)} = A(\omega_j)^{-1} O_{(x_r)}$; and for $S(x_r,x_s,\omega_j)$, there is an excitation value $a(\omega_j)$ only at $x_r=x_s$, and in this case, $a(\omega_j)=S(x_s,x_s,\omega_j)$; and when $x_r \neq x_s$, $S(x_r,x_s,\omega_j)=0$.

$$p_{(\omega_j,x_r)} = a(\omega_j)A(\omega_j)^{-1}O_{(x_r)}$$

$$P(\omega_j) = \left[p_{(\omega_j,x_1)}, \ldots , p_{(\omega_j,x_M)}\right]$$

$$P(\omega) = A(\omega)^{-1}S(\omega) = a(\omega_j)A(\omega_j)^{-1}\left[O_{(x_1)}, \ldots , O_{(x_M)}\right]$$

The following formula is then derived: $\tilde{P}(\omega_j)=[\tilde{p}_{(\omega_j,x_1)}, \ldots, \tilde{p}_{(\omega_j,x_M)}]$, $\tilde{P}(\omega_j)$ representing a unit forward wave field. In the formula (21), $\tilde{p}_{(\omega_j,x_r)}$ is obtained from the unit forward wave field.

The partial derivative matrix of certain data (the lth data) relative to all sound velocity parameters may be directly calculated b the following formula:

$$J_l = \frac{\partial \hat{D}_l}{\partial c} = [f_{(l,1)}, f_{(l,2)}, \ldots , f_{(l,N)}]^T \tilde{p}_{(\omega_j,x_r)} \tag{22}$$

where $J_l$ represents the N×1 partial derivative matrix of the lth data; and $f_{(l,n)}$ represents a virtual source vector corresponding to the lth data and the nth parameter and is obtained by the total virtual source matrix, where the total virtual source matrix is expressed as: $F(\omega)=[F^{(1)}(\omega), \ldots, F^{(N)}(\omega)]$.

For frequency $\omega_j$, the following can be derived:

$$\left[f_{(l,n)}, f_{(l+1,n)}, \ldots , f_{(l+M^2-1,n)}\right] = \left[F^{(n)}(\omega_j), F^{(n)}(\omega_j), \ldots , F^{(n)}(\omega_j)\right]$$

In the above equation, the virtual source matrix is repeated for 64 times in a row direction on the right of the equation.

Thus, to obtain the whole partial derivative matrix of a piece of data, forward calculation only needs to be performed once, and the calculation complexity is reduced by 1/N, rendering the calculation of the partial derivative matrix J feasible.

N diagonal elements of $H_a$ are calculated by the following formula:

$$\text{diag}(H_a) = \sum_{j=1}^{N_\omega}\sum_{s=1}^{M}\sum_{r=1}^{M} J_l \circ J_l \tag{23}$$

where ∘ represents Hadamard multiplication, $l=(j-1)M^2+(s-1)M+r$.

A time-zero imaging condition is a traditional imaging condition usually for self-transmitted and self-received signals, which involves an assumption that a reflected signal is actively emitted by a reflection point at time 0. Therefore, an image of the reflection point can be obtained by reconstructing the wave field at time 0. For FMC data, the imaging condition is modified to an excitation-time imaging condition, where the excitation time is a time when an incident wave reaches a reflector. Conventional imaging methods, including total focusing method (TFM), phase shift migration (PSM), and reverse time migration (RTM), use the excitation-time imaging condition to image defects. The search-vector imaging condition is constructed from the perspective of full waveform inversion, as shown in the formula (19). Such an imaging condition is strictly derived from a formula and there is no assumption regarding the wave field. Therefore, the theory of such an imaging condition is stricter, and higher imaging precision can be guaranteed.

The high-precision imaging method for testing an internal defect of a complex-shaped component using an ultrasonic FMC dataset in the present disclosure is summarized into three steps: preprocessing of input data, iterative calculation of the gradient matrix $\nabla_c E(c)$ and the approximate Hessian matrix $\text{diag}(H_a)$ in the frequency domain, and implementation of the search-vector imaging condition.

The input data includes the excitation signal, the sound velocity model, and the FMC data (full matrix capture data). The excitation signal of a probe is usually unknown. Therefore, the excitation signal is approximated using a proper wavelet, and its spectral distribution should be similar to the obtained FMC data as much as possible. The discretization of the sound velocity model is mainly decided by the finite difference method. The FMC data $D(x_r,x_s,t)$ contains reflected signals from various interfaces and defects within a measurement area. Assuming that the sound velocity model is smooth without reflection, model data is $\hat{D}(x_r,x_s,t)=0$ and a residual dataset is $\delta D(c)=D$. The advantage of doing so is that all reflecting interfaces can be imaged clearly, and therefore, the residual matrix $\delta D(c,\omega_j)$ can be obtained by direct Fourier transformation of the FMC data in time dimension.

The second step is the main body of the whole method. This step is implemented in the frequency domain. Therefore, a particular calculated frequency range $[\omega_{min},\omega_{max}]$ is selected according to a center frequency band of the FMC data. A discretization step size $d\omega$ is decided by a sampling frequency and a number of sampling points, and a number of frequencies is $N_\omega$. At frequency $\omega_j$, LU decomposition is performed on the impedance matrix $A(\omega_j)$ according to the formulas (4) and (14), which is utilized to process the sound source matrix and the residual matrix so that the forward wave field $P(\omega_j)$ and the residual wave field $V(\omega_j)$ can be calculated, respectively. Moreover, as shown in the formula (11), the forward wave field $P(\omega_j)$ is multiplied by all partial derivative impedance matrices to obtain the total virtual source matrix $F(\omega_j)=[F^{(1)}(\omega_j), \ldots, F^{(N)}(\omega_j)]$. Moreover, $P(\omega_j)$ is normalized by the amplitude of the excitation value $a(\omega_j)$ of the excitation signal so that the unit forward wave field $\tilde{P}(\omega_j)$ can be obtained. The forward wave field is multiplied by the total virtual source matrix $F(\omega_j)$, as shown in the formula (22), thereby obtaining $M^2$ partial derivative vectors $[J_l, \ldots, J_{l+M^2-1}]$, $l=(j-1)M^2+1$. Meanwhile, the total virtual source matrix $F(\omega_j)$ is also multiplied by the residual wave field $V(\omega_j)$, as shown in the formula (13), thereby obtaining the gradient matrix $\nabla_c E(c,\omega_j)$. The above operations are performed for each discrete frequency $\omega_j$. Therefore, all the discrete frequencies are traversed according to the above steps. After the completion of traversal, summation is performed according to the formulas (15) and (23) to obtain the gradient matrices $\nabla_c E(c)$ and the approximate Hessian matrices $\text{diag}(H_a)$ of all the discrete frequencies.

Finally, the search-vector imaging condition is performed according to the formula (19), and the imaging result Im is output. That is, the high-precision image of the internal defect of the complex-shaped component is obtained.

Compared with the prior art, the present disclosure has the following beneficial effects:

According to the high-precision ultrasonic imaging method for an internal defect of a complex-shaped component based on a search-vector imaging condition in the present disclosure, based on full waveform inversion, the search-vector imaging condition is constructed, and a first-order derivative vector is combined with an approximate Hessian matrix for correction so that a high-quality image of a defect in a complex sound velocity model can be obtained.

The high-precision ultrasonic imaging method is suitable for defect testing on complex surface components. The imaging condition used for the imaging method of the present disclosure does not involve an assumption on a wave field and is stricter than a traditional imaging condition theory, thereby ensuring high precision of the inventive method. Moreover, the imaging method of the present disclosure can highlight a defect in an entire measurement area, which is very convenient for locating a defect in a large-size measurement structure. Compared with traditional methods, the imaging method of the present disclosure significantly improves the imaging resolution and increases a signal to noise ratio (SNR).

BRIEF DESCRIPTION OF THE DRAWINGS

FIG. 5A to FIG. 5D are diagrams of overall imaging results of TFM, FD-RTM, GDM, and the imaging method in the embodiment of the present disclosure; and FIG. 5E to FIG. 5H are partially enlarged diagrams of FIG. 5A to FIG. 5D.

Figure 1:
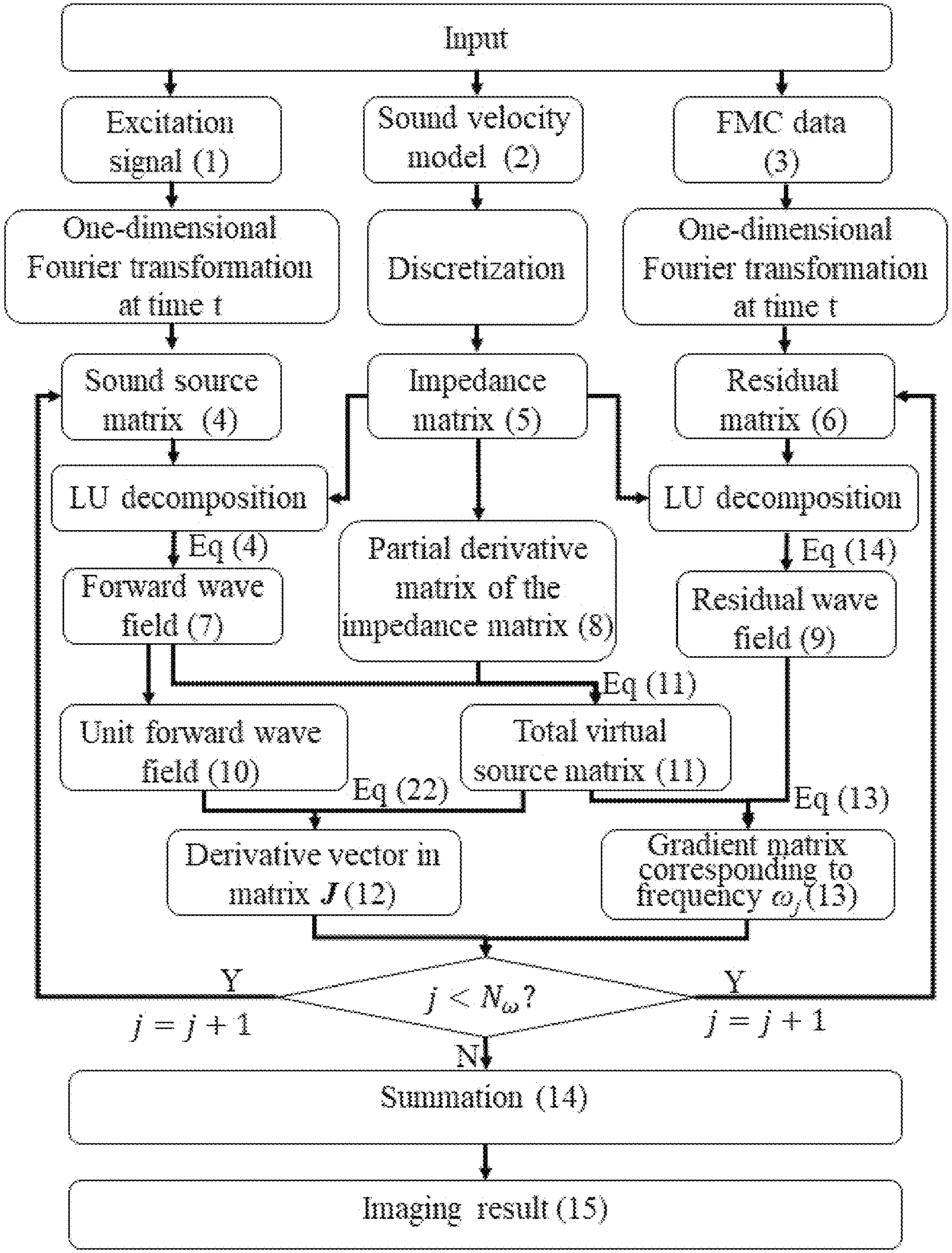
FIG. 1 is a flowchart of an imaging method according to an embodiment of the present disclosure.

Reference numerals in FIG. 1: (1) indicates $S(x_r,x_s,\omega_j)$, (2) indicates c(x,y), (3) indicates $D(x_i,x_s,t_j)$, (4) indicates $S(x_r,x_s,\omega_j)$, (5) indicates $A(w_j)$, (6) indicates $\delta D(c,w_j)$, (7) indicates $P(w_j)$, (8) indicates $\partial A(w_j)/\partial c_1, \ldots, \partial A(w_j)/\partial c_N$, (9) indicates $V(w_j)$, (10) indicates $\tilde{P}(w_j)=P(w_k)/a(w_j)$, (11) indicates $F(w_j)=[F^{(1)}(w_j), \ldots, F^{(N)}(w_j)]$, (12) indicates $[J_l, \ldots, J_{l+M^2-1}]$, $l=(j-1)M^2+1$, (13) indicates $\nabla_c E(c,w_j)$, (14) indicates $$\nabla_c E(c)_n = \sum_{j=1}^{N_\omega}\sum_{s=1}^{M}\sum_{r=1}^{M}\nabla_c E(c, w_j)_{(s-1)N+n,r},$$

$$\text{diag}(H_a) = \sum_{j=1}^{N_\omega}\sum_{s=1}^{M}\sum_{r=1}^{M} J_l \circ J_l,$$

(15) indicates $$Im = -[\text{diag}(H_a) + \gamma I]^{-1}\nabla_c E(c).$$

DETAILED DESCRIPTION OF THE EMBODIMENTS

As shown in FIG. 1, a high-precision ultrasonic imaging method for an internal defect of a complex-shaped component based on a search-vector imaging condition includes the following steps.

(1) An excitation signal $S(x_r,x_s,t)$, a sound velocity model c(x,z), and FMC data $D(x_r,x_s,t)$ measured, where $x_r$ represents the rth receiving array element; $x_s$ represents the sth transmitting array element; r and s are both taken from [1,M]; M represents a number of array elements; and t represents a time.

(2) Temporal one-dimensional Fourier transformation is performed on the excitation signal and the FMC data to obtain a sound source matrix $S(x_r,x_s,\omega)$ and FMC data $D(x_r,x_s,\omega)$ within a frequency domain, respectively.

A calculation formula for a residual matrix $\delta D(c)$ is as follows:

$$\delta D(c) = D - \hat{D}(c)$$

where D represents a measured value of the FMC data, i.e., $D(x_r,x_s,\omega)$; and $\hat{D}(c)$ represents an estimated value of the FMC data.

Assuming that the sound velocity model is smooth without reflection, the estimated value of the FMC data is 0, and the residual matrix is $\delta D(c,\omega)=D(x_r,x_s,\omega)$, ω representing a frequency.

The sound velocity model is discretized by using a finite difference method to obtain the sound velocity vector, and the impedance matrix is obtained through calculation by the following formula:

$$A(\omega) = [\nabla^2 + \omega^2/c^2]$$

where A(ω) represents an N×N impedance matrix; $\nabla^2$ represents a laplace operator obtained after the discretization; and c represents an N×1 sound velocity vector.

(3) For any frequency $\omega_j$ not traversed, the sound source matrix $S(x_r,x_s,\omega_j)$ and the residual matrix $D(x_r,x_s,\omega_j)$ are solved by LU decomposition of the impedance matrix $A(\omega_j)$ to obtain a forward wave field and a residual wave field of the frequency, respectively.

A solving formula for the forward wave field is as follows:

$$P(\omega) = [p_1(\omega), p_2(\omega), \ldots, p_M(\omega)] = A(\omega)^{-1}S(\omega)$$

where S(ω) represents the sound source matrix, and the sound source matrix corresponding to frequency $\omega_j$ is $S(x_r, x_s,\omega_j)$; P(ω) represents the forward wave field, and the forward wave field corresponding to frequency $\omega_j$ is $P(\omega_j)$.

A solving formula for the residual wave field is as follows:

$$V(\omega_j) = A(\omega_j)^{-1}W^T\delta D(c, \omega_j)$$

where $V(\omega_j)$ represents the residual wave field corresponding to frequency $\omega_j$; $\delta D(c,\omega_j)$ represents the residual matrix corresponding to the frequency $\omega_j$, $j\in[1,N_\omega]$; $N_\omega$ represents a number of discrete frequencies; W represents a matrix of M×N, which extracts a sound field value at a node corresponding to a receiving array element in the entire wave field; an element at a node corresponding to the kth receiving array element in the kth row is 1, and other elements are all 0, where $k\in[1,M]$, and M<N; and the superscript T represents transposition.

(4) The impedance matrix is multiplied by the forward wave field after a partial derivative of the sound velocity vector is obtained to obtain a total virtual source matrix. The total virtual source matrix is defined as.

$$F(\omega)=\left[F^{(1)}(\omega),\ \ldots\ ,F^{(n)}(\omega)\right]$$

where $$F^{(n)}(\omega)=-\frac{\partial A(\omega)}{\partial c_n}P(\omega)$$

where F(W)(ω) is regarded as the nth virtual source, which is an N×M matrix; $c_n$ represents the nth sound velocity parameter (element) in the sound velocity vector; and n∈[1, N].

Meanwhile, the forward wave field is normalized by an amplitude of an excitation value of the excitation signal to obtain a unit forward wave field.

$$\tilde{P}(\omega_j)=P(\omega_j)/a(\omega_j)$$

where $\tilde{P}(\omega_j)$ represents the unit forward wave field; $a(\omega_j)=S(x_s,x_s,\omega_j)$, for $S(x_r,x_s,\omega_j)$, there is an excitation value $a(\omega_j)$ only at $x_r=x_s$; and when $x_r\neq x_s$, $S(x_r,x_s,\omega_j)=0$.

(5) The total virtual source matrix is multiplied by the unit forward wave field and the residual wave field to obtain a partial derivative matrix and a gradient matrix corresponding to the frequency, respectively.

A calculation formula for multiplying the total virtual source matrix by the unit forward wave field to obtain the partial derivative matrix is as follows:

$$J_l=\frac{\partial\hat{D}_l}{\partial c}=[f_{(l,1)},f_{(l,2)},\ \ldots\ ,f_{(l,N)}]^T\tilde{p}_{(\omega_j,x_r)}$$

where $J_l$ represents the N×1 partial derivative matrix of the lth data, where l=[1, . . . , L], $L=N_\omega\times M\times M$, representing a number of data points; and $l=(j-1)M^2+(s-1)M+r$.

$f_{(l,n)}$ represents a virtual source vector corresponding to the lth data and the nth parameter and is obtained by the total virtual source matrix, where the total virtual source matrix is expressed as: $F(\Omega)=[F^{(1)}(\omega), \ldots, F^{(N)}(\omega)]$.

For frequency $\omega_j$, the following can be derived:

$$\left[f_{(l,n)},f_{(l+1,n)},\ \ldots\ ,f_{(l+M^2-1,n)}\right]=\left[F^{(n)}(\omega_j),F^{(n)}(\omega_j),\ \ldots\ ,F^{(n)}(\omega_j)\right]$$

In the above equation, the virtual source matrix is repeated for 64 times in a row direction on the right of the equation.

$\tilde{p}_{(\omega_j,x_r)}$ is derived from the unit forward wave field $\tilde{P}(\omega_j)$:

$$\tilde{P}(\omega_j)=\left[\tilde{p}_{(\omega_j,x_1)},\ \ldots\ ,\tilde{p}_{(\omega_j,x_M)}\right]$$

A calculation formula for multiplying the total virtual source matrix by the residual wave field to obtain the gradient matrix is as follows:

$$\nabla_cE(c,\omega_j)=F(\omega_j)^T\left[A(\omega_j)^{-1}W^T\delta D(c,\omega_j)\right]=F(\omega_j)^TV(\omega_j)$$

where $F(\omega_j)$ represents the total virtual source matrix corresponding to the frequency $\omega_j$.

(6) Steps (3) to (5) are repeated until all frequencies are traversed completely to obtain partial derivative matrices and gradient matrices of all the frequencies, and an imaging result of an internal defect of a complex-shaped component is obtained by using a search-vector imaging condition.

The search-vector imaging condition is as follows:

$$Im=-[\mathrm{diag}(H_a)+\gamma I]^{-1}\nabla_cE(c)$$

where Im represents the imaging result; I represents an N-dimension unit matrix; $\nabla_cE(c)$ represents an N×1 gradient matrix; and γ represents a damping coefficient for stable inversion.

$H_a=J^TJ^*$, where J represents the partial derivative matrix; and superscripts T and * represent transposition and complex conjugation, respectively.

The nth element in $\nabla_cE(c)$ is obtained by the following formula:

$$\nabla_cE(c)_n=\sum_{j=1}^{N_\omega}\sum_{s=1}^{M}\sum_{r=1}^{M}\nabla_cE(c,\omega_j)_{(s-1)N+n,r}$$

where the subscript of $\nabla_cE(c,\omega_j)_{(s-1)N+n,r}$ represents an element in row (s−1)N+n and column r; and n∈[1,N].

N diagonal elements of $H_a$ are obtained through calculation by the following formula according to all the partial derivative matrices:

$$\mathrm{diag}(H_a)=\sum_{j=1}^{N_\omega}\sum_{s=1}^{M}\sum_{r=1}^{M}J_l\circ J_l$$

where $\mathrm{diag}(H_a)$ represents an approximate Hessian matrix; and a represents Hadamard multiplication, $l=(j-1)M^2+(s-1)M+r$.

The theoretical derivation process of the ultrasonic imaging method is as follows.

1.1 Frequency Wave Field

A frequency-domain wave field in an inhomogeneous medium meets the following formula:

$$\left|\nabla^2+\frac{\omega^2}{c(x,z)^2}\right]p(x,z,\omega)=s(x,z,\omega)\quad(1)$$

where x and z represent two spatial coordinates of a two-dimensional space, respectively; ω represents a frequency; z represents a depth; p(x,z,ω) represents a sound field (wave field); s(x,z,ω) represents a sound source field; and c(x,z) represents a sound velocity model.

Figure 2A:
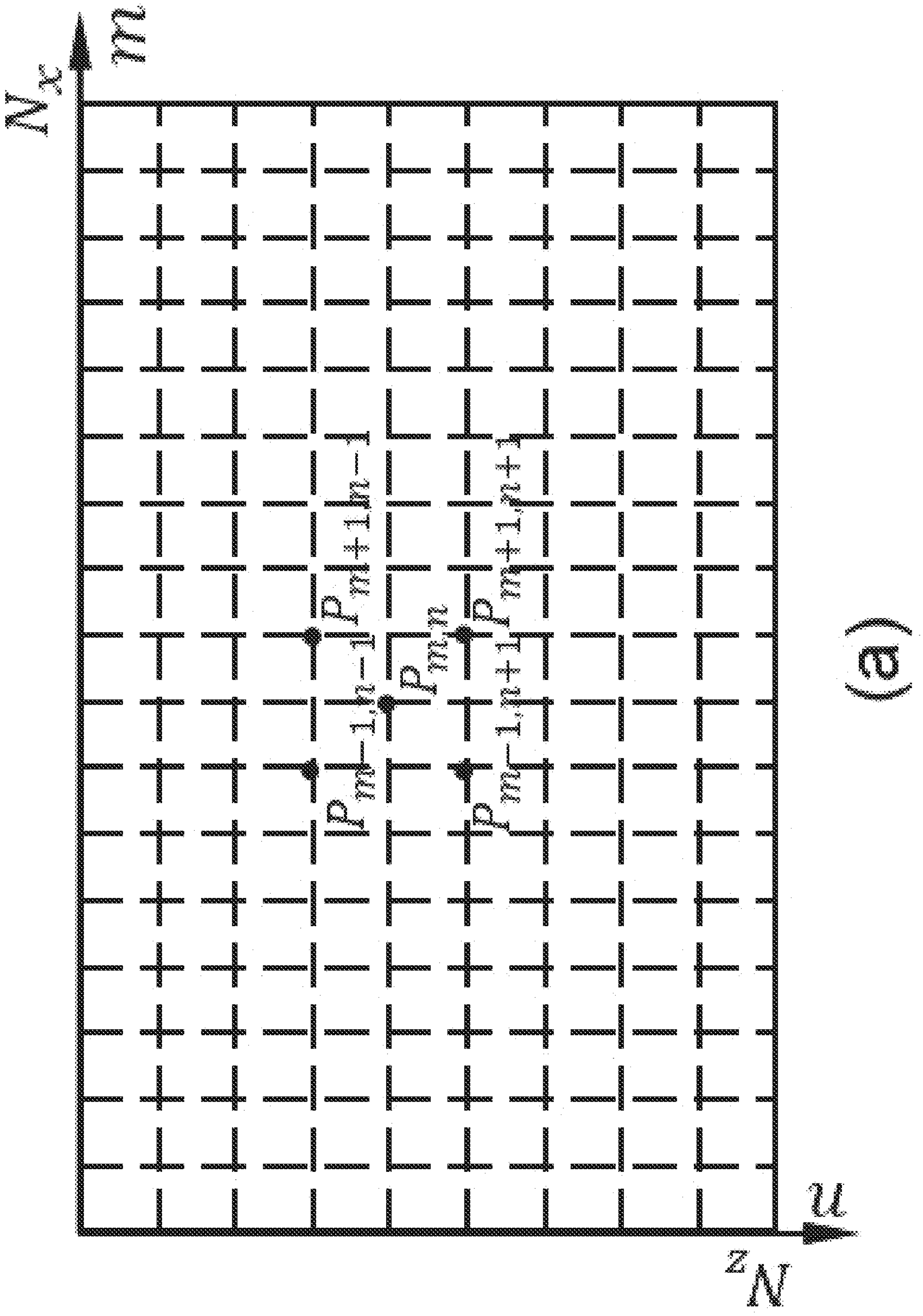
FIG. 2A is a schematic diagram of sound field discretization.
Figure 2B:
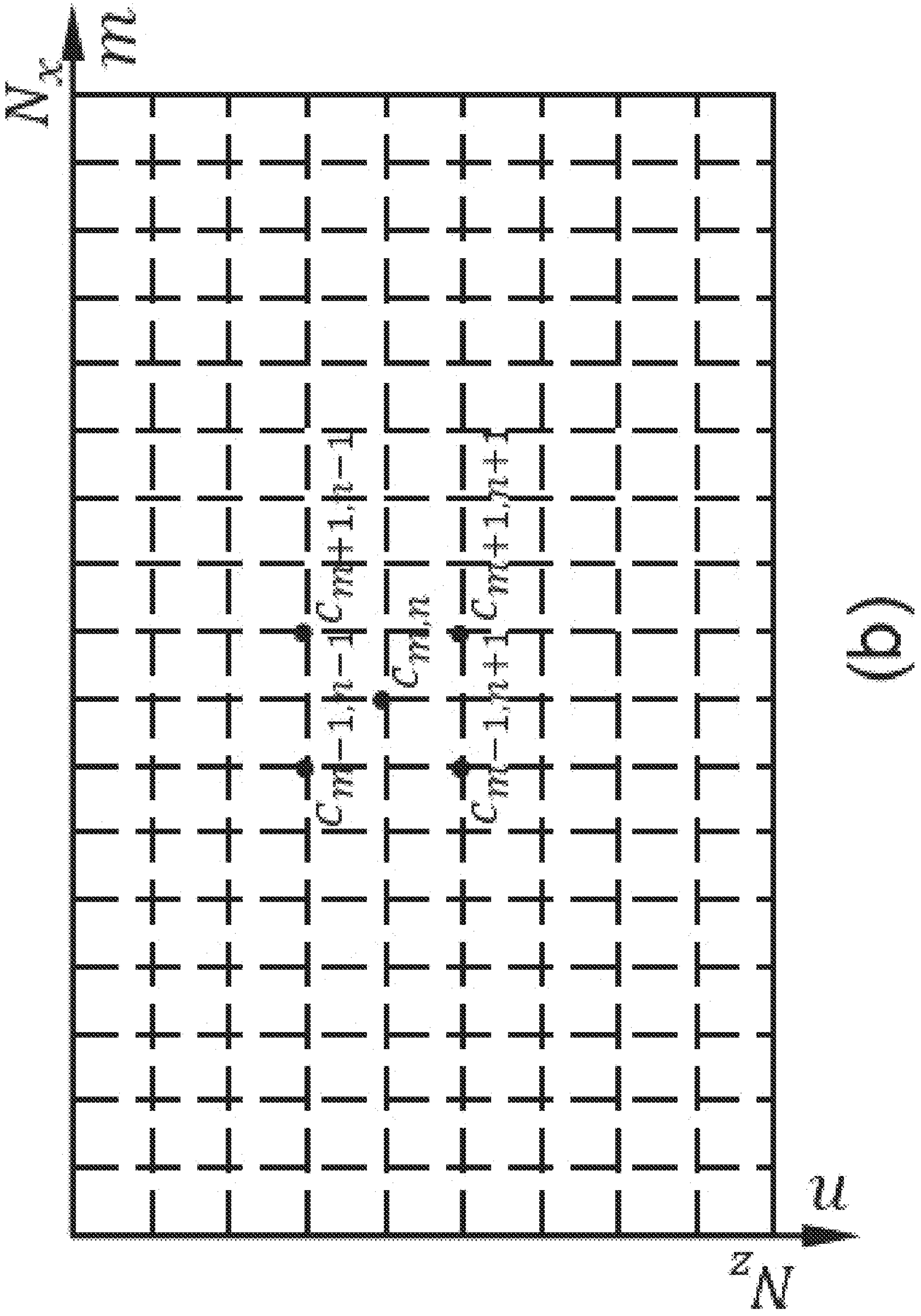
FIG. 2B is a schematic diagram of sound velocity model discretization.

In engineering practice, the formula (1) is usually solved by the finite difference method, where the wave field and the sound velocity model are discretized into $N=N_x\times N_z$ points, as shown in FIG. 2.

A discretized wave equation is as follows:

$$\left[\nabla^2+\frac{\omega^2}{c^2}\right]p(\omega)=A(\omega)p(\omega)=s(\omega)\quad(2)$$

where c represents a sound velocity vector; p(ω) represents a wave field vector; s(ω) represents a sound source vector, and the three vectors are all N×1 vectors.

$A(\omega)=[\nabla^2+\omega^2/c^2]$ is an N×N impedance matrix, where $\nabla^2$ represents a laplace operator obtained after the discretization.

Therefore, the wave field p(ω) may be obtained by the following formula:

$$p(\omega) = A(\omega)^{-1}s(\omega) \tag{3}$$

where $A(\omega)^{-1}$ represents inverting A(ω); and LU decomposition of the impedance matrix may be introduced into the calculation of the wave field to improve the calculation efficiency.

Figure 3:
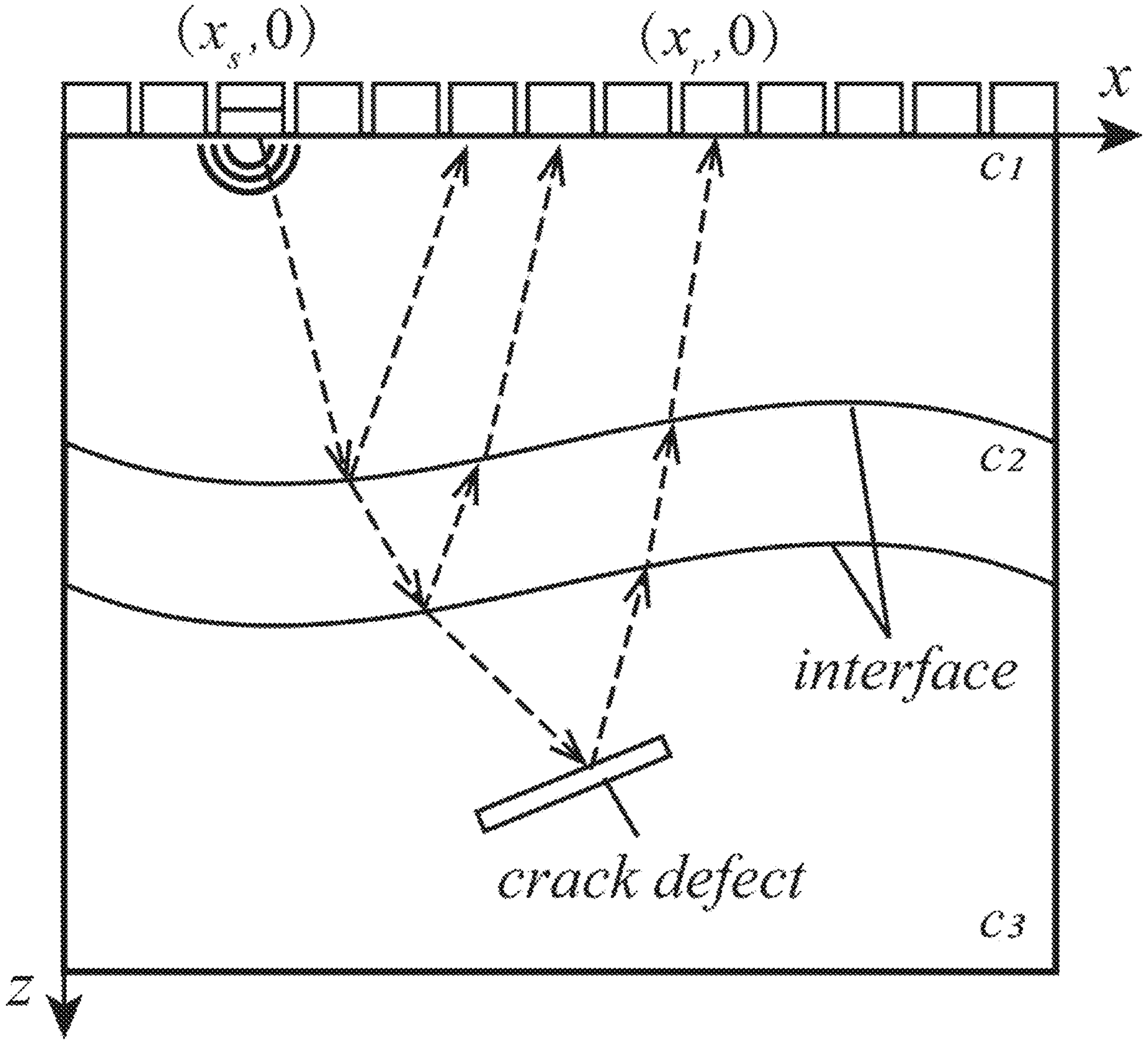
FIG. 3 is a schematic diagram of phased array testing of a component defect.

The schematic diagram of phased array testing of a defect is as shown in FIG. 3. Array elements are excited orderly, and meanwhile, all the array elements receive signals. Therefore, FMC data (full matrix capture data) contains a time-domain signal of each transmitting-receiving pair, which is represented by $D(x_r,x_s,t)$ here, where $x_r$ and $x_s$ correspond to the rth receiving array element and the sth transmitting array element, respectively; s∈[1,M], r∈[1,M], and M represents a number of array elements. As shown in FIG. 2, an ultrasonic signal is emitted from array element $(x_s,0)$ and is received by an array element at position $(x_r,0)$ after being reflected by an interface and a defect. Each array element in a phased array can be represented by a node corresponding to the position of a center point in a discrete model, and wave fields at these nodes can be known from an FMC dataset.

The sound source matrix $S(\omega)=[s_1(\omega), s_2(\omega), \ldots, s_M(\omega)]$ is used to represent a sound source of the phased array having M array elements, and corresponding wave fields excited for the M array elements may be solved through one step by the following formula:

$$P(\omega) = [p_1(\omega), p_2(\omega), \ldots, p_M(\omega)] = A(\omega)^{-1}S(\omega) \tag{4}$$

where P(ω) represents a wave field matrix of the FMC data.

1.2 Full Waveform Inversion and Gradient Vector

Given the sound source matrix and the sound velocity model, the wave field matrix of the FMC data is calculated according to the formula (4); and frequency-domain FMC data is obtained by a wave field value at a corresponding node of a received, which is written as:

$$\hat{D}(c, \omega) = WP(\omega) \tag{5}$$

where $\hat{D}(c,\omega)$ represents an estimated value of the FMC data; W represents an M×N matrix, which extracts a sound field value at a node corresponding to a receiving array element in the entire wave field; an element at a node corresponding to the kth receiving array element in the kth row is 1, and other elements are all 0, where k∈[1,M], and M<N; and $\hat{D}(c,\omega)$ is an M×M matrix, and its element at position (r, s) corresponds to a signal received by the rth array element when the sth array element is excited. The entire FMC data $\hat{D}(c)$ obtained through the calculation may be obtained by combining $\hat{D}(c,\omega)$ of each frequency.

A difference between the calculated FMC data D(c) and the measured FMC data D is defined as a residual matrix, written as:

$$\delta D(c) = D - \hat{D}(c) \tag{6}$$

where δD(c) and $\hat{D}(c)$ are both functions of the sound velocity vector c. The sound velocity vector c that minimizes the modulus of the residual matrix δD(c) is closest to the real sound velocity, which is the base of the full waveform inversion.

Here, an objective function is defined by using the $l_2$ norm of residual data δD(c):

$$E(c) = \frac{1}{2}\delta D(c)^T\delta d(c)^* = \frac{1}{2}\sum_{j=1}^{N_\omega}\sum_{s=1}^{M}\sum_{r=1}^{M}\left[D(x_r, x_s, \omega_j) - \hat{D}(x_r, x_s, \omega_j)\right]^2 \tag{7}$$

where the superscripts T and * represent transposition and complex conjugation, respectively; $N_\omega$ represents a number of discrete frequencies; M represents the number of array elements; and $D(x_r,x_s,\omega)$ is obtained by performing Fourier transformation on $D(x_r,x_s,t)$ in time dimension.

A negative gradient direction may be used to update the sound velocity vector, written as:

$$\nabla_c E(c) = J^T\delta D(c) \tag{8}$$

where $\nabla_c E(c)$ represents a gradient matrix; J is an L×N Frechet partial derivative matrix, and an element thereof is expressed as:

$$J_{l,n} = \frac{\partial \hat{D}_l}{\partial c_n} = \frac{\partial \hat{D}(x_r, x_s, \omega_j)}{\partial c_n}, l = [1, \ldots, L]; n = [1, \ldots, N] \tag{9}$$

where $L=N_\omega\times M\times M$ represents a number of data points; $l=(j-1)M^2+(s-1)M+r$; and j∈[1,N].

Formula (10) may be derived by obtaining a partial derivative of the nth sound velocity parameter $c_n$ on both sides of the formula (4):

$$\frac{\partial P(\omega)}{\partial c_n} = A(\omega)^{-1}\left[-\frac{\partial A(\omega)}{\partial c_n}P(\omega)\right] = A(\omega)^{-1}F^{(n)}(\omega) \tag{10}$$

where $\frac{\partial A(\omega)}{\partial c_n}$ where $\partial A(\omega)/\partial c_n$ represents an N×N partial derivative impedance matrix, which is a result of obtaining the partial derivative of the nth sound velocity parameter $c_n$ by the impedance matrix.

The form of the formula (10) is similar to that of the formula (4). $F^{(n)}(\omega)$ may be regarded as the nth virtual source, which is an N×M matrix, written as:

$$F^{(n)}(\omega) = -\frac{\partial A(\omega)}{\partial c_n}P(\omega) \tag{11}$$

-continued

Therefore, $\frac{\partial P(\omega)}{\partial c_n}$ is an N×M matrix, which is a solution of a forward problem.

Then, the Frechet partial derivative matrix at frequency $\omega_j$ may be written as:

$$J(\omega_l) = W\left[\frac{\partial P(\omega_j)}{\partial c_1}, \ldots, \frac{\partial P(\omega_j)}{\partial c_n}\right] = WA(\omega_j)^{-1}\left[F^{(1)}(\omega_j), \ldots, F^{(N)}(\omega_j)\right], \tag{12}$$

where $J(\omega_j)$ represents an M×MN matrix, and the whole Frechet partial derivative matrix J may be obtained by combining the $J(\omega_j)$ corresponding to all the discrete frequencies $\omega_j$.

A total virtual source matrix may be defined as $F(\omega)=[F^{(1)}(\omega), \ldots, F^{(N)}(\omega)]$, which is an N×MN matrix.

Explicitly calculating the partial derivative matrix J is highly time-consuming, and the gradient matrix may be directly calculated by substituting the formula (12) into the formula (8):

$$\nabla_c E(c, \omega_j) = F(\omega_j)^T\left[A(\omega_j)^{-1} W^T \delta D(c, \omega_j)\right] = F(\omega_j)^T V(\omega_j) \tag{13}$$

where $\delta D(c,\omega_j)$ represents an M×M residual data matrix at frequency $\omega_j$; and $\nabla_c E(c,\omega_j)$ represents an MN×M gradient matrix at frequency $\omega_j$.

Residual wave field $V(\omega_j)$ is an N×M matrix, which is calculated by the following formula:

$$V(\omega_j) = A(\omega_j)^{-1} W^T \delta D(c, \omega_j) \tag{14}$$

The nth element of the gradient matrix $\nabla_c E(c)$ is calculated by the following formula:

$$\nabla_c E(c)_n = \sum_{j=1}^{N_\omega} \sum_{s=1}^{M} \sum_{r=1}^{M} \nabla_c E(c, \omega_j)_{(s-1)N+n,\, r} \tag{15}$$

where the subscript of $\nabla_c E(c,\omega_j)_{(s-1)N+n,r}$ represents an element in row (s−1)N+n and column r.

In conclusion, to calculate a gradient component of each frequency $\omega_j$, forward modeling may be performed for 2 M times, where the forward modeling is performed for M times to obtain a forward wave field $P(\omega)$ according to the formula (4), and performed for another M times to obtain the residual wave field $V(\omega)$, as shown in formula (14). Therefore, the calculation quantity required by the gradient matrix $\nabla_c E(c)$ is acceptable, and the efficiency can be further improved by a parallel calculation method.

Most importantly, the wave fields generated by all the nodes as single scattering points are collected by the Frechet partial derivative matrix J at a receiving node, and the residual matrix $\delta D(c)$ is real data received by a sensor from an unknown scattering point. Therefore, as shown in the formula (8), the gradient matrix is actually a result of zero-lag correlation between a corresponding scattering signal at each node and a real scattering signal. Naturally, a correlation value is large on real scattering point, but small on non-scattering points, and the non-scattering points occupy most of the measurement area. Therefore, the gradient matrix may be used as an image of a reflection point, and the formula (8) may be used as an imaging condition.

1.3 Search-Vector Imaging Condition

The negative gradient direction may be directly used to minimize the objective function (7). However, to increase a search speed, Newton method is usually used to correct a gradient in the full waveform inversion, denoted as:

$$dc = -H^{-1}\nabla_c E(c) \tag{16}$$

where dc represents the search vector; H represents an N×N Hessian matrix; and an element of H is obtained by formula (17):

$$H_{pq} = \frac{\partial^2 E(c)}{\partial c_p \partial c_q},\ p = (1, 2, \ldots, N);\ q = (1, 2, \ldots, N) \tag{17}$$

Since only the defect position is unknown for ultrasonic imaging, the input sound velocity model is approximate to actual sound velocity distribution, and the Hessian matrix may be approximated as:

$$H \approx H_a = J^T J^* \tag{18}$$

As can be seen from the formulas (9) and (18), a main diagonal element of $H_a$ is an auto-correlative zero-lag value of a partial derivative wave field on the receiving node, and non-diagonal elements are correlated zero-lag values of two partial derivative wave fields on the receiving node. In a high-frequency limit, $H_a$ is diagonally dominant.

Therefore, the diagonal elements of $H_a$ are used to approximate the Hessian matrix to avoid inverse operation of an unrealistic huge N-dimension matrix, and the search-vector imaging condition is written as:

$$\mathrm{Im} = -[\mathrm{diag}(H_a) - \gamma I]^{-1}\nabla_c E(c) = -[\mathrm{diag}(H_a) + \gamma I]^{-1} J^T \delta D(c) \tag{19}$$

where Im represents an imaging result; $\mathrm{diag}(H_a)$ represents diagonalizing $H_a$; I represents an N-dimension unit matrix; and $\gamma$ represents a damping coefficient for stable inversion.

As described in section 1.2, the gradient matrix may be directly used as the image of the defect.

According to the formula (8), the gradient matrix depends on the Frechet partial derivative J. The partial derivative is composed of all partial derivative wave fields at the receiving node. Therefore, the characteristics of the partial derivative matrix J itself may affect the imaging result. On the one hand, the energy of the partial derivative wave field corresponding to a node at a deep position is always smaller than that at a shallow position, and therefore, the partial derivative matrix J may lead to insufficient illumination at a lower portion of an imageable area. On the other hand, different relative positions of a node to a sound source node and the receiving node may lead to different energy of the partial derivative wave fields, and therefore, the partial derivative matrix J may also lead to nonuniform illumination of the imageable area in the horizontal direction. The introduction of the Hessian matrix may eliminate the insufficient and nonuniform illumination caused by the Frechet partial derivative matrix J at gradients, enable a clearer and more concentrated imaging result, and balance imaging amplitudes at various positions.

According to the formula (18), the partial derivative matrix J needs to be solved to calculate $H_a$. However, it is unrealistic to directly calculate the partial derivative matrix 1 by the formula (12) because too much forward calculation is required.

Based on the definition of the partial derivative matrix J, the formula (9) may be further written as:

$$J_{l,n} = \frac{\partial \hat{D}_l}{\partial c_n} = O_{(x_r)}^T A(\omega_j)^{-1} f_{(l,n)} \tag{20}$$

where $f_{(l,n)}$ represents a virtual source vector corresponding to the lth data and the nth parameter; and.

$O_{(x_r)}$ is an N×1 vector, which is 1 only at node $(x_r,0)$ and 0 at other nodes. Therefore, the physical significance of $J_{l,n}$ is a received signal at node $f_{(l,n)}$ corresponding to the sound field excited by the virtual source vector $(x_r,0)$. In effect, $f_{(l,n)}$ represents the corresponding sound source at node n.

According to the reciprocal theorem, the wave field signal emitted by the nth node and received by node $(x_r,0)$ is equal to the wave field signal emitted by node $(x_r,0)$ and received by the nth node.

Therefore, $J_{l,n}$ may be obtained by the following formula:

$$J_{l,n} = f_{(l,n)}^T A(\omega_j)^{-1} O_{(x_r)} = f_{(l,n)}^T \tilde{p}_{(\omega_j,x_r)} \tag{21}$$

where $\tilde{p}_{(\omega_j,x_r)}=A(\omega_j)^{-1}O_{(x_r)}$; and for $S(x_r,x_s,\omega_j)$, there is an excitation value $a(\omega_j)$ only at $x_r=x_s$, and in this case, $a(\omega_j)=S(x_s,x_s,\omega_j)$; and when $x_r\neq x_s$, $S(x_r,x_s,\omega_j)=0$.

$$p_{(\omega_j,x_r)} = a(\omega_j)A(\omega_j)^{-1}O_{(x_r)}$$

$$P(\omega_j) = \left[p_{(\omega_j,x_1)}, \dots , p_{(\omega_j,x_M)}\right]$$

$$P(\omega) = A(\omega)^{-1}S(\omega) = a(\omega_j)A(\omega_j)^{-1}\left[O_{(x_1)}, \dots , O_{(x_M)}\right]$$

The following formula is then derived: $\tilde{P}(\omega_j)=[\tilde{p}_{(\omega_j,x_1)}, \dots, \tilde{p}_{(\omega_j,x_M)}]$ The partial derivative matrix of certain data (the lth data) relative to all sound velocity parameters may be directly calculated by the following formula:

$$J_l = \frac{\partial \hat{D}_l}{\partial c} = [f_{(l,1)}, f_{(l,2)}, \dots , f_{(l,N)}]^T \tilde{p}_{(\omega_j,x_r)} \tag{22}$$

where $J_l$ represents the N×1 partial derivative matrix of the lth data, and $f_{(l,n)}$ represents a virtual source vector corresponding to the lth data and the nth parameter and is obtained by the total virtual source matrix, where the total virtual source matrix is expressed as: $F(\omega)=[F^{(1)}(\omega), \dots, F^{(N)}(\omega)]$.

For frequency $\omega_j$, the following can be derived:

$$\left[f_{(l,n)}, f_{(l+1,n)}, \dots , f_{(l+M^2-1,n)}\right] = \left[F^{(n)}(\omega_j), F^{(n)}(\omega_j), \dots , F^{(n)}(\omega_j)\right]$$

In the above equation, the virtual source matrix is repeated for 64 times in a row direction on the right of the equation.

Thus, to obtain the whole partial derivative matrix of a piece of data, forward calculation only needs to be performed once, and the calculation complexity is reduced by 1/N, rendering the calculation of the partial derivative matrix J feasible.

N diagonal elements of $H_a$ are calculated by the following formula:

$$\mathrm{diag}(H_a) = \sum_{j=1}^{N_\omega}\sum_{s=1}^{M}\sum_{r=1}^{M} J_l \circ J_l \tag{23}$$

where ∘ represents Hadamard multiplication, $l=(j-1)M^2+(s-1)M+r$.

A time-zero imaging condition is a traditional imaging condition usually for self-transmitted and self-received signals, which involves an assumption that a reflected signal is actively emitted by a reflection point at time 0. Therefore, an image of the reflection point can be obtained by reconstructing the wave field at time 0. For FMC data, the imaging condition is modified to an excitation-time imaging time, where the excitation time is a time when an incident wave reaches a reflector. Conventional imaging methods, including total focusing method (TFM), phase shift migration (PSM), and reverse time migration (RTM), use the excitation-time imaging time to image defects. The search-vector imaging condition is constructed from the perspective of full waveform inversion, as shown in the formula (19). Such an imaging condition is strictly derived from a formula and there is no assumption regarding the wave field. Therefore, the theory of such an imaging condition is stricter, and higher imaging precision can be guaranteed.

Testing Experiment

The following experiment is conducted to verify the imaging effect of the internal defect of the complex-shaped component by the imaging method in the present embodiment.

Figure 4:
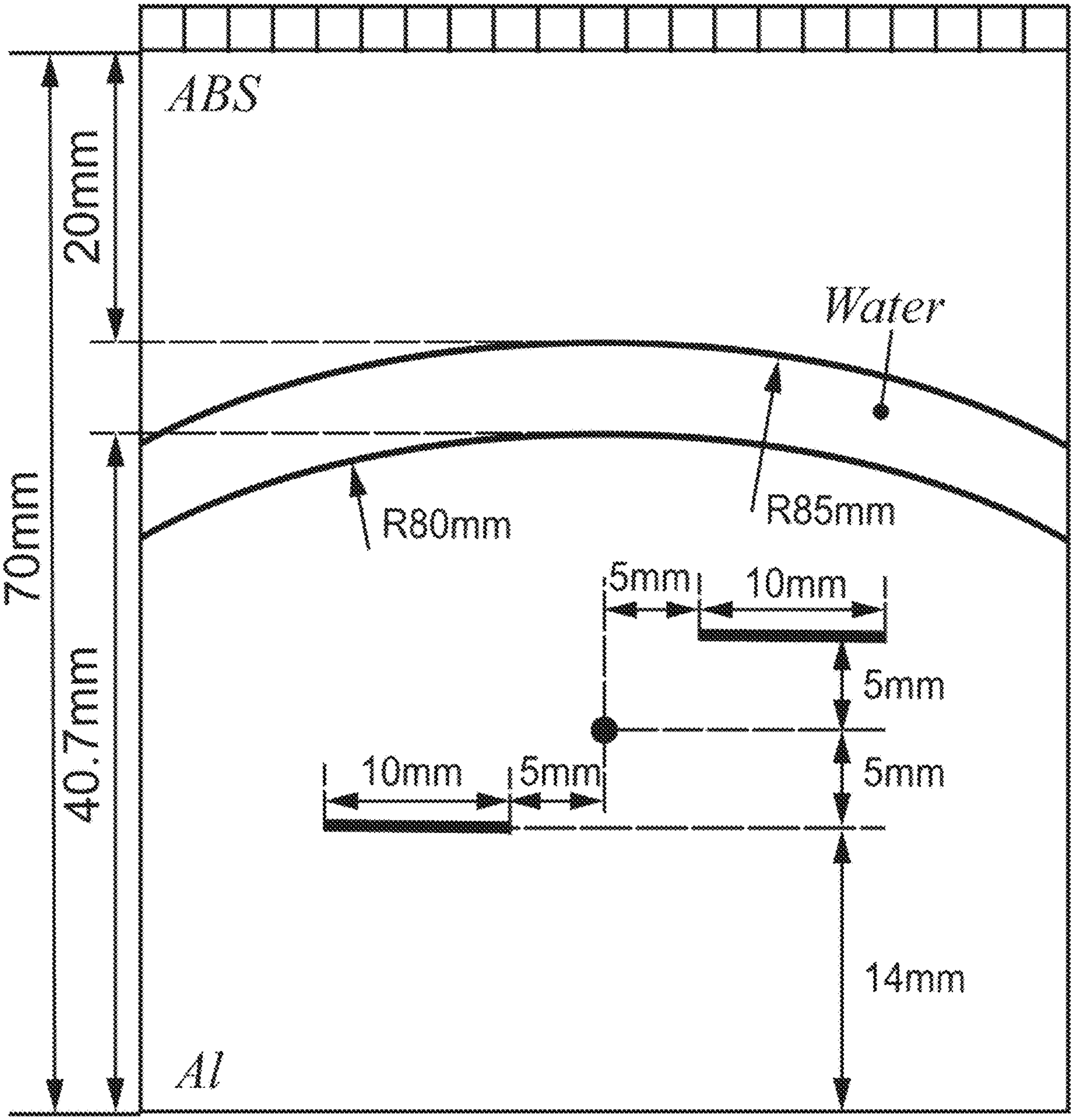
FIG. 4 is a schematic diagram of defect testing in a curved-surface aluminum component in an embodiment of the present disclosure.

The FMC data is collected by using 64/64 OEM-PA (AOS. limited company, the United States) with a sampling frequency of 50 MHz and a time range of 80 μs. An aluminum component with a circular surface is used as a measurement object. As shown in FIG. 4, crack and pore defects are measurement objects. A 64-element array transducer (Guangdong Gaohua Corporation Limited, China) with a center frequency of 2.5 MHz and an interval of 0.75 mm is used as an ultrasonic transceiver in the experiment. The components are immersed in water. Since the phased array is not an immersion probe, a wedge block made of acrylonitrile-butadiene-styrene (ABS) is used to protect the probe from water, and the sound velocity of the wedge block is 2200 m/s. The bottom of the wedge is a concave surface so that more ultrasonic waves are concentrated in the measured component. Water, as a coupling agent, fills the gap between the wedge block and the component but does not reach the top surface of the wedge block.

Experimental data (FMC data) is processed by using TFM, FD-RTM, GDM, and the imaging method of the present embodiment separately. The frequency band (frequency range) selected by these methods is from 1 MHz to 4 MHz. The parameter $\gamma$ of the imaging method of the present embodiment is chosen to be 0.05. The overall imaging results of the four methods are as shown in FIG. 5A to FIG. 5D, and defects are easy to find in the results of TFM and the imaging method of the present embodiment in FIG. 5A and FIG. 5D. Due to insufficient illumination, the defect imaging results can be hardly found in the results of FD-RTM and GDM in FIG. 5B and FIG. 5C.

Figure 5A:
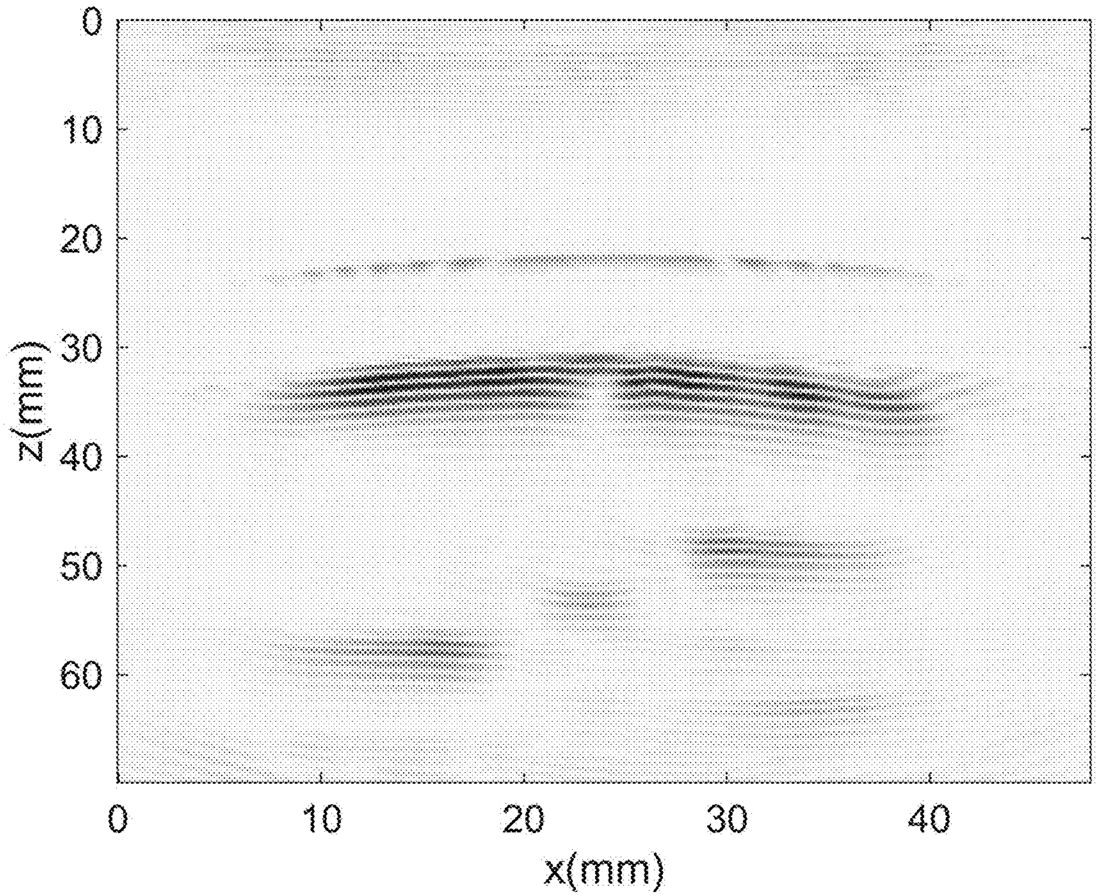
FIGS. 5A-H are comparison diagrams of overall imaging results and local imaging results obtained by different imaging methods, where
Figure 5B:
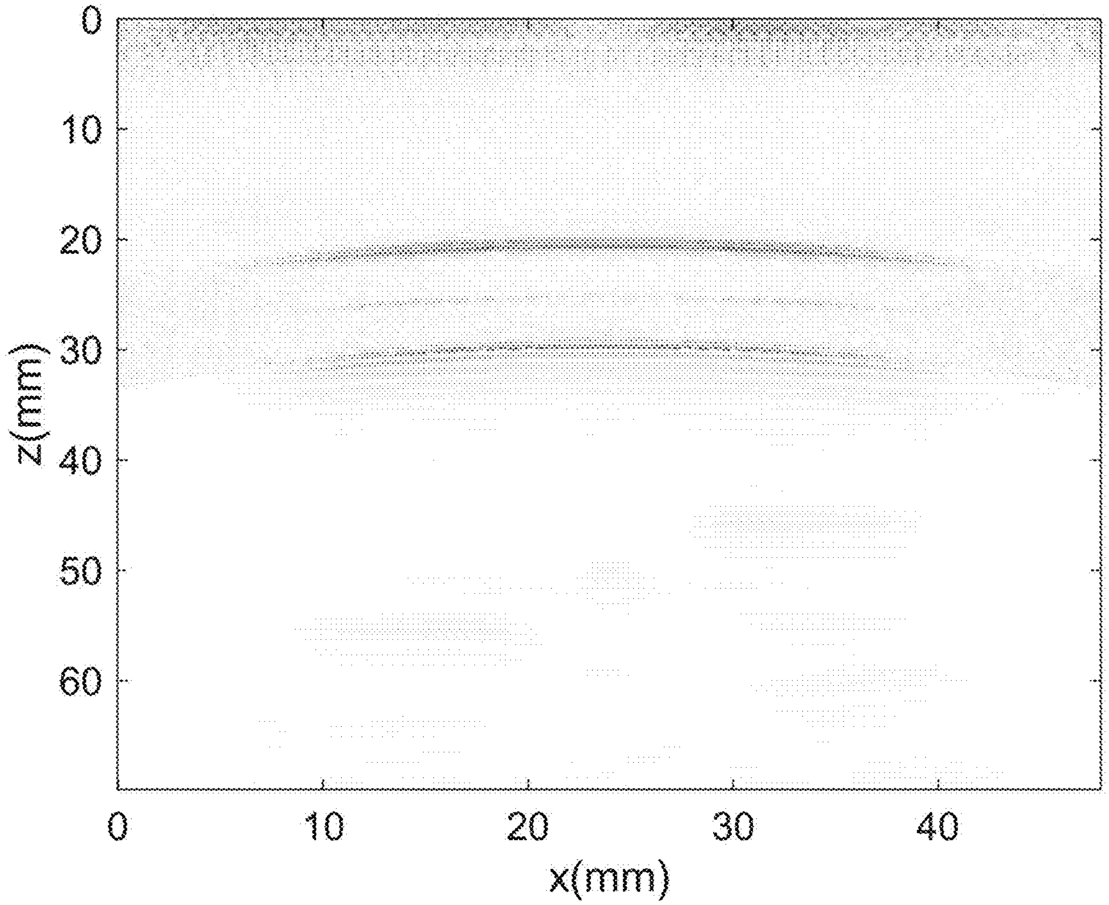
Figure 5C:
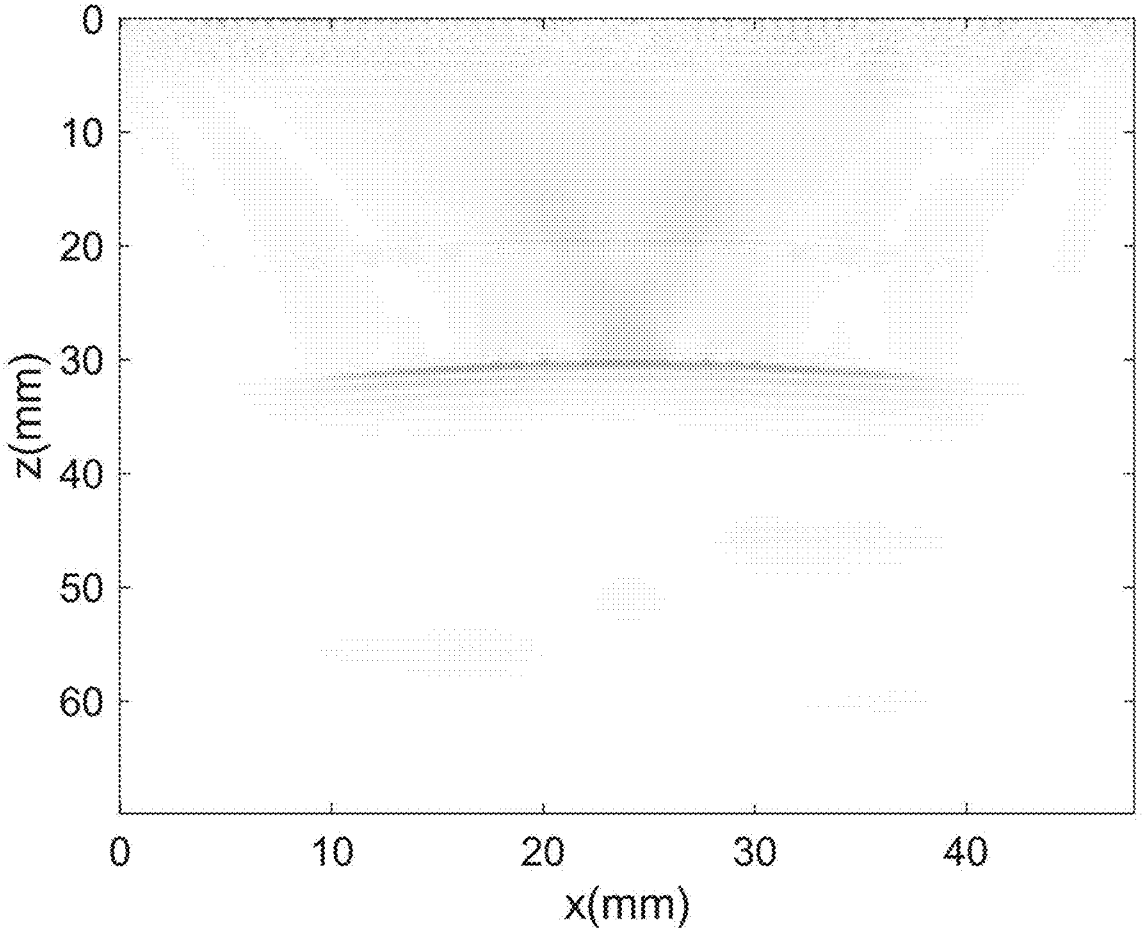
Figure 5D:
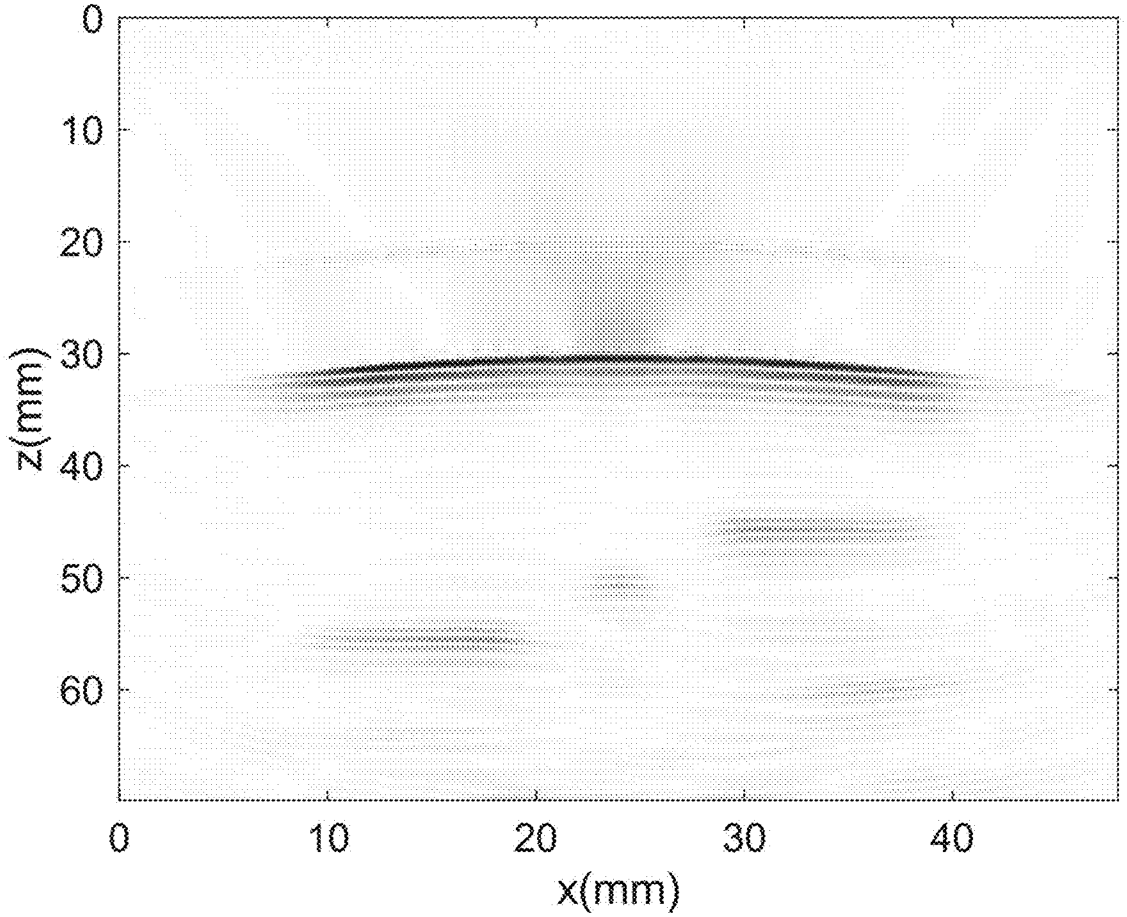
Figure 5E:
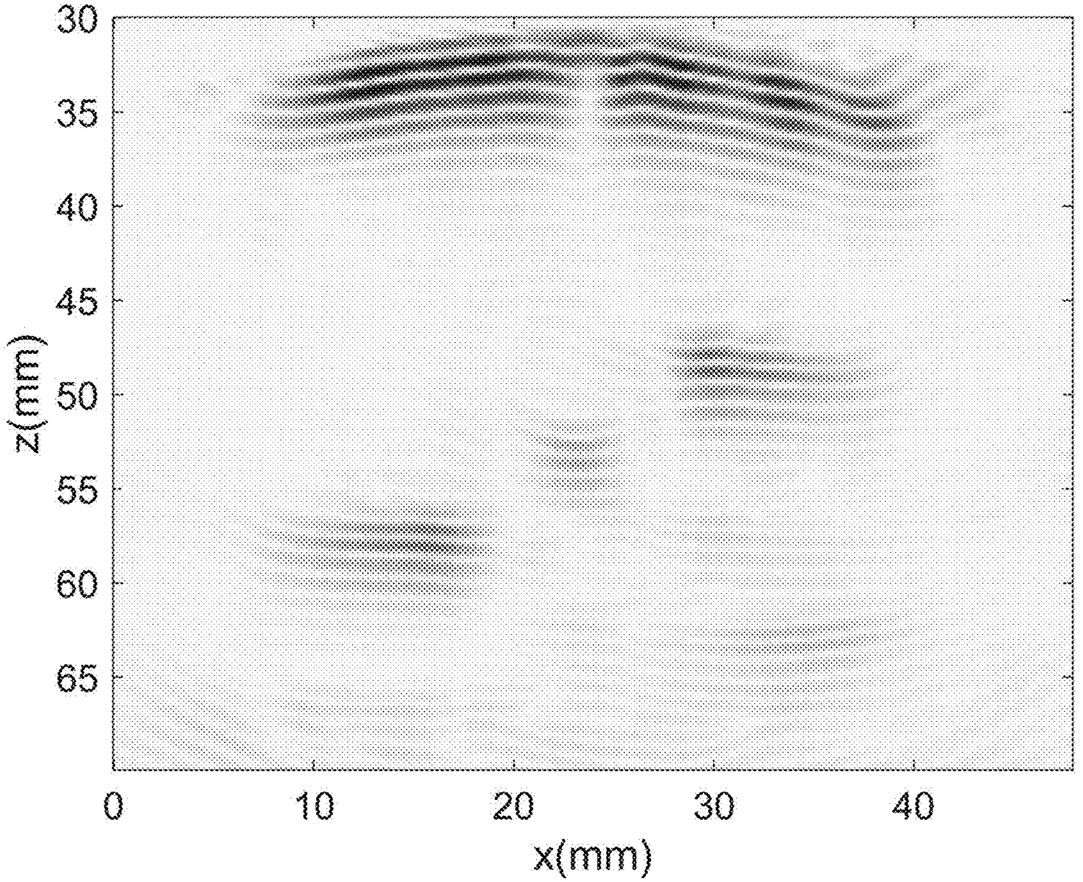
Figure 5F:
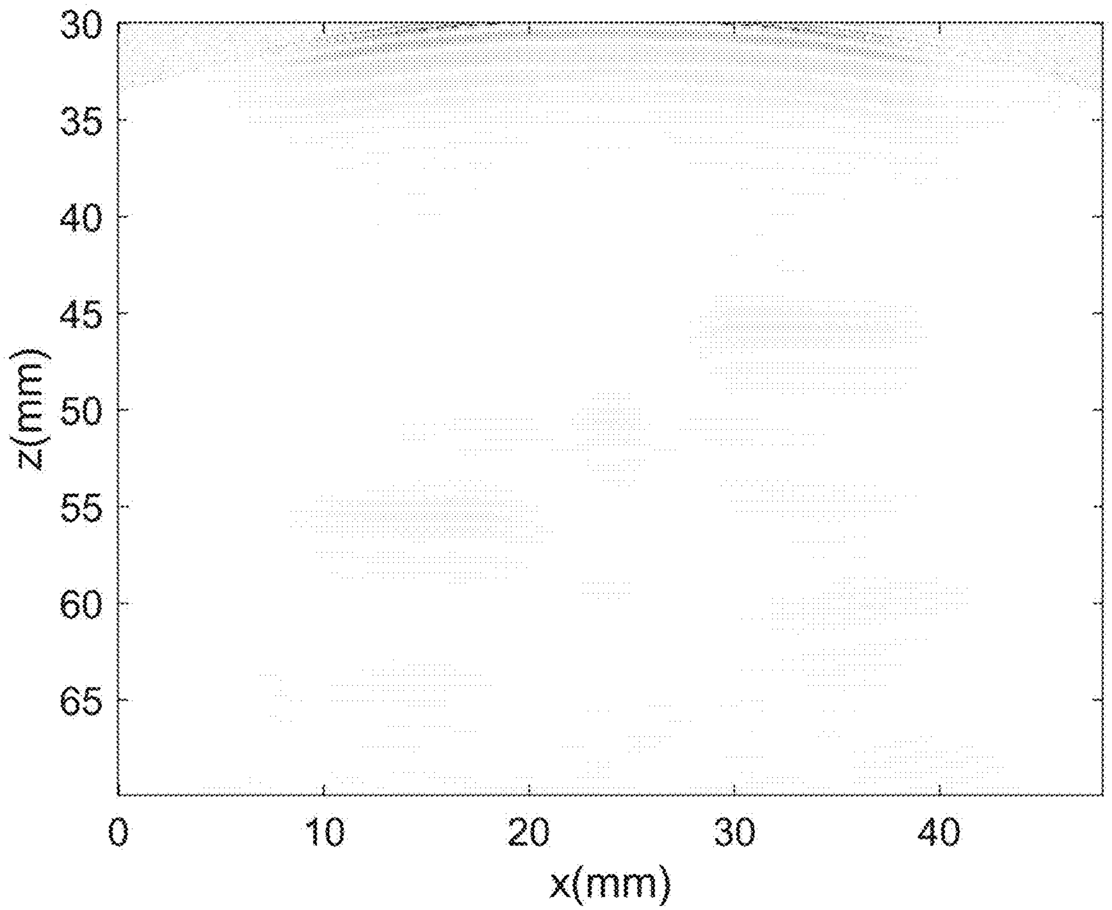
Figure 5G:
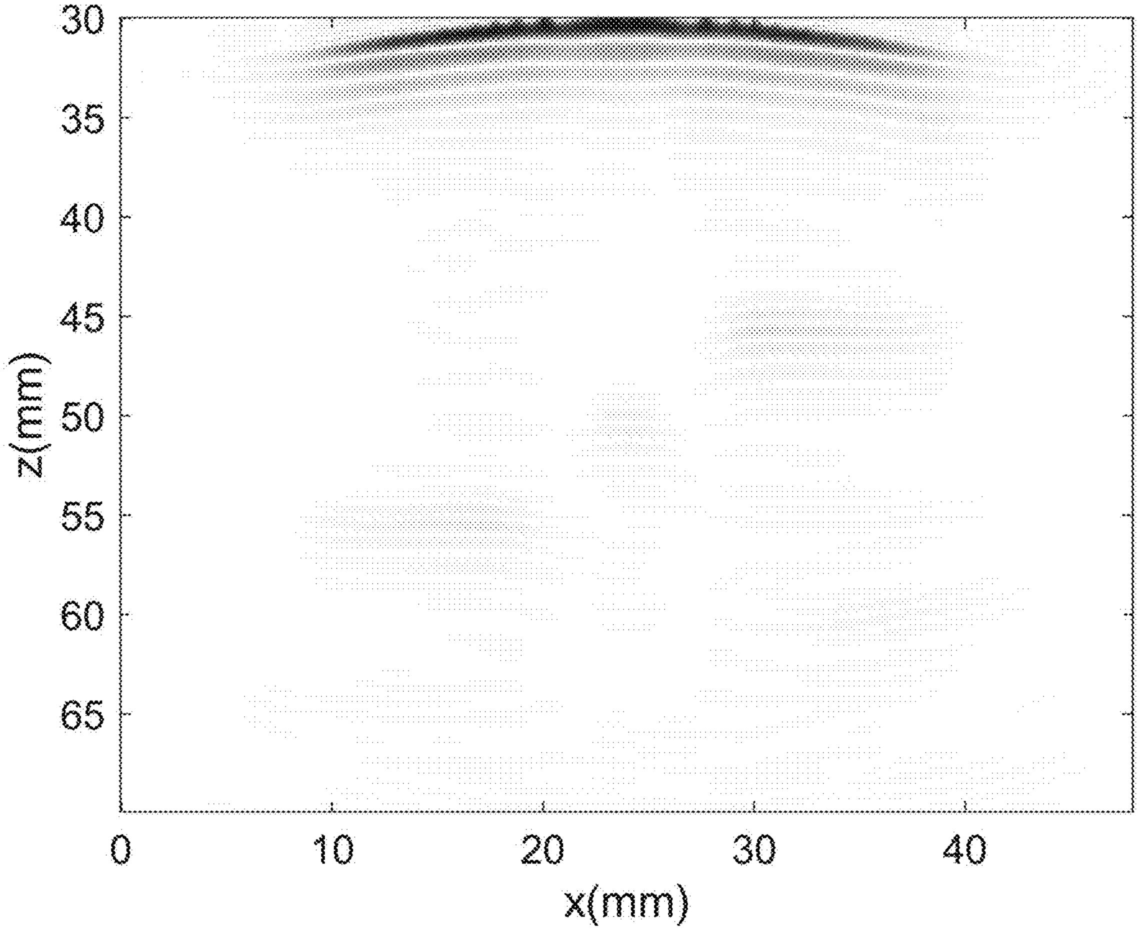
Figure 5H:
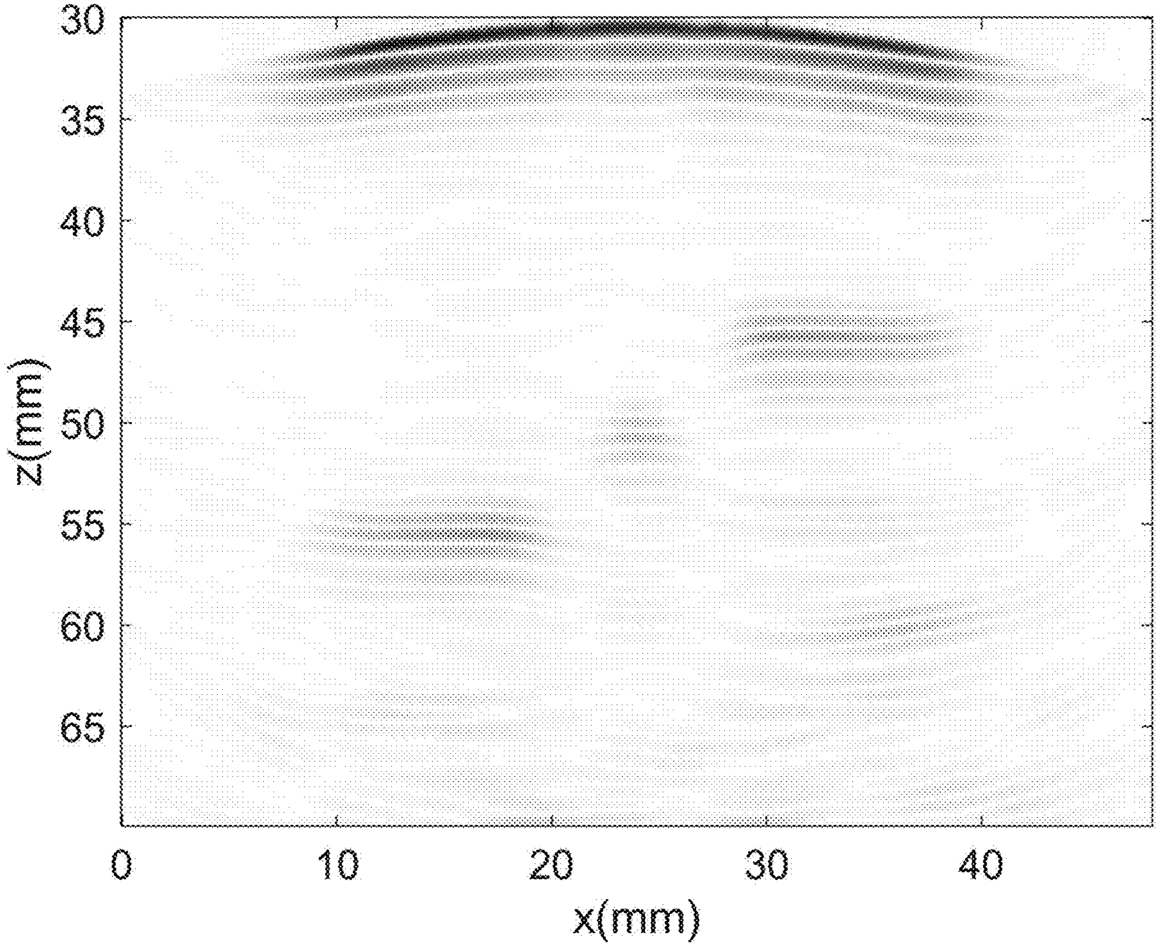

Moreover, FIG. 5E to FIG. 5H show the partially enlarged images of the imaging results of the above four imaging methods. Here, it is still difficult to distinguish between the defect images in the results of FD-RTM and GMD in FIG. 5G and FIG. 5F, and the contrast of the defect in the imaging result of GMD in FIG. 5E is higher than that of the imaging result of FD-RTM in FIG. 5F. However, in FIG. 5E, the artifact around the defect is very serious, and cracks are slightly distorted. The imaging result of the imaging method of the present embodiment in FIG. 5H indicates that the crack form can be correctly imaged, and background artifacts can be well inhibited.

What is claimed is:

1. A high-precision ultrasonic imaging method for an internal defect of a complex-shaped component based on a search-vector imaging condition, comprising:

(1) inputting an excitation signal, a sound velocity model, and full matrix capture (FMC) data; wherein the FMC data is measured from an ultrasonic phased array;

(2) preprocessing the excitation signal and the FMC data to obtain a sound source matrix and a residual matrix within a frequency domain, respectively;

discretizing the sound velocity model to obtain a sound velocity vector, and obtaining an impedance matrix by calculation;

(3) for any discrete frequency not traversed in a predetermined frequency range selected according to a center frequency band of the FMC data, solving the sound source matrix and the residual matrix by LU decomposition of the impedance matrix to obtain a forward wave field and a residual wave field of the discrete frequency, respectively;

(4) multiplying the impedance matrix by the forward wave field after obtaining a partial derivative of the sound velocity vector to obtain a total virtual source matrix, and normalizing the forward wave field by an amplitude of an excitation value of the excitation signal to obtain a unit forward wave field;

(5) multiplying the total virtual source matrix by the unit forward wave field and the residual wave field to obtain a partial derivative matrix and a gradient matrix corresponding to the discrete frequency, respectively; and (6) repeating steps (3) to (5) until all the discrete frequencies in the predetermined frequency range are traversed completely to obtain partial derivative matrices and gradient matrices of all the discrete frequencies in the predetermined frequency range, and obtaining an imaging result of an internal defect of a complex-shaped component by using a search-vector imaging condition.

2. The high-precision ultrasonic imaging method for an internal defect of a complex-shaped component based on a search-vector imaging condition according to claim 1, wherein in step (2), a calculation formula for the residual matrix $\delta D(c)$ is as follows:

$$\delta D(c) = D - \hat{D}(c)$$

wherein D represents a measured value of the FMC data; and $\hat{D}(c)$ represents an estimated value of the FMC data;

assuming that the sound velocity model is smooth without reflection, the estimated value of the FMC data is 0, and the residual matrix is $\delta D(c)=D$; and temporal one-dimensional Fourier transformation is performed on the measured FMC data within a time domain to obtain FMC data within a frequency domain, namely the residual matrix within the frequency domain.

3. The high-precision ultrasonic imaging method for an internal defect of a complex-shaped component based on a search-vector imaging condition according to claim 1, wherein the search-vector imaging condition in step (6) is as follows:

$$Im = -[\mathrm{diag}(H_\alpha) + \gamma I]^{-1} \nabla_c E(c)$$

wherein Im represents the imaging result; I represents an N-dimension unit matrix; $\nabla_c E(c)$ represents the gradient matrix; and $\gamma$ represents a damping coefficient for stable inversion; and $H_a = J^T J^*$, wherein J represents the partial derivative matrix; and superscripts T and * represent transposition and complex conjugation, respectively.

* * * * *